(12) United States Patent
Wenzel

(10) Patent No.: US 9,298,203 B2
(45) Date of Patent: *Mar. 29, 2016

(54) SYSTEMS AND METHODS FOR CONTROLLING ENERGY USE IN A BUILDING MANAGEMENT SYSTEM USING ENERGY BUDGETS

(71) Applicant: Johnson Controls Technology Company, Holland, MI (US)

(72) Inventor: Michael J. Wenzel, Oak Creek, WI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,745

(22) Filed: May 13, 2014

(65) Prior Publication Data

US 2014/0249680 A1 Sep. 4, 2014

Related U.S. Application Data

(63) Continuation of application No. 13/396,514, filed on Feb. 14, 2012, now Pat. No. 8,755,943, which is a continuation-in-part of application No. 13/251,134, filed on Sep. 30, 2011, now Pat. No. 8,843,238.

(51) Int. Cl.
*G05F 1/66* (2006.01)
*H02J 3/14* (2006.01)
(Continued)

(52) U.S. Cl.
CPC ............... *G05F 1/66* (2013.01); *G05D 23/1917* (2013.01); *H02J 3/14* (2013.01); *F24F 11/006* (2013.01);
(Continued)

(58) Field of Classification Search
CPC ................. G06Q 50/06; F24F 11/0012; F24F 2011/0073; F24F 2011/0075; F24F 2011/0094; H02J 2003/143; H02J 2003/146; Y04S 10/54; Y04S 20/224; G05D 23/00; G05D 23/1904; G05D 23/1923; G05B 2219/2642; F24H 1/0018; G06F 1/26
USPC ......... 700/275, 276, 286, 291, 295–297, 299, 700/300; 702/57, 60, 127, 130, 182; 705/400, 412; 165/200, 201, 238, 266; 236/46 R
See application file for complete search history.

(56) References Cited

U.S. PATENT DOCUMENTS

| 3,872,286 A | 3/1975 | Putman |
| 5,244,148 A | 9/1993 | Vandermeyder |

(Continued)

FOREIGN PATENT DOCUMENTS

EP 0 994 345 4/2000

OTHER PUBLICATIONS

Lee et al., "Evaluation of methods for determining demand-limiting setpoint trajectories in buildings using short-term measurements", Science Direct Building and Environment, vol. 43, Issue 10, Oct. 2008, pp. 1769-1783.

(Continued)

*Primary Examiner* — Crystal J Barnes-Bullock
(74) *Attorney, Agent, or Firm* — Foley & Lardner LLP

(57) ABSTRACT

Systems and methods for limiting power consumption by a heating, ventilation, and air conditioning (HVAC) subsystem of a building are shown and described. A mathematical linear operator is found that transforms the unused or deferred cooling power usage of the HVAC system based on pre-determined temperature settings to a target cooling power usage. The mathematical operator is applied to the temperature settings to create a temperature setpoint trajectory expected to provide the target cooling power usage.

20 Claims, 8 Drawing Sheets

(51) Int. Cl.
*G05D 23/19* (2006.01)
*F24F 11/00* (2006.01)
*H02J 3/00* (2006.01)

(52) U.S. Cl.
CPC ........ *H02J 2003/007* (2013.01); *Y02B 70/3225* (2013.01); *Y02B 70/3275* (2013.01); *Y04S 20/222* (2013.01); *Y04S 20/244* (2013.01)

(56) References Cited

U.S. PATENT DOCUMENTS

| | | | |
|---|---|---|---|
| 5,568,377 | A | 10/1996 | Seem et al. |
| 6,122,605 | A | 9/2000 | Drees et al. |
| 6,154,681 | A | 11/2000 | Drees et al. |
| 6,185,483 | B1 | 2/2001 | Drees |
| 6,219,590 | B1 | 4/2001 | Bernaden, III et al. |
| 6,341,599 | B1 | 1/2002 | Hada et al. |
| 6,430,985 | B1 | 8/2002 | Drees |
| 6,477,439 | B1 | 11/2002 | Bernaden, III et al. |
| 6,896,404 | B2 | 5/2005 | Seki et al. |
| 7,024,254 | B2 | 4/2006 | Salsbury et al. |
| 7,130,719 | B2 | 10/2006 | Ehlers et al. |
| 7,346,433 | B2 | 3/2008 | Budike, Jr. |
| 7,783,390 | B2 | 8/2010 | Miller |
| 7,785,004 | B2 | 8/2010 | Kautz et al. |
| 7,860,495 | B2 | 12/2010 | McFarland |
| 8,010,815 | B2 | 8/2011 | Hamilton et al. |
| 8,069,359 | B2 | 11/2011 | Tolentino |
| 8,145,361 | B2 | 3/2012 | Forbes et al. |
| 8,180,493 | B1 | 5/2012 | Laskow |
| 8,204,628 | B2 * | 6/2012 | Schnell ................ F24F 11/006 165/239 |
| 8,204,633 | B2 | 6/2012 | Harbin et al. |
| 8,326,466 | B2 | 12/2012 | Peterson |
| 8,356,760 | B2 | 1/2013 | Riley, Jr. |
| 8,442,695 | B2 | 5/2013 | Imes et al. |
| 8,464,086 | B2 | 6/2013 | Cepulis |
| 8,843,238 | B2 * | 9/2014 | Wenzel ................ F24F 11/006 236/44 C |
| 2003/0153986 | A1 | 8/2003 | Salsbury et al. |
| 2004/0215356 | A1 | 10/2004 | Salsbury et al. |
| 2005/0209813 | A1 | 9/2005 | Kautz et al. |
| 2008/0277486 | A1 | 11/2008 | Seem et al. |
| 2008/0298431 | A1 | 12/2008 | Kautz et al. |
| 2010/0187832 | A1 | 7/2010 | Holland et al. |
| 2010/0324962 | A1 | 12/2010 | Nesler et al. |
| 2011/0047418 | A1 | 2/2011 | Drees et al. |
| 2011/0061015 | A1 | 3/2011 | Drees et al. |
| 2011/0093133 | A1 | 4/2011 | Turney et al. |
| 2011/0130886 | A1 | 6/2011 | Drees et al. |
| 2011/0178977 | A1 | 7/2011 | Drees |
| 2011/0257911 | A1 | 10/2011 | Drees et al. |
| 2012/0022700 | A1 | 1/2012 | Drees et al. |
| 2012/0084063 | A1 | 4/2012 | Drees et al. |
| 2012/0091804 | A1 | 4/2012 | Altonen et al. |
| 2012/0117989 | A1 | 5/2012 | Turney et al. |
| 2012/0150707 | A1 | 6/2012 | Campbell et al. |
| 2013/0013119 | A1 | 1/2013 | Mansfield et al. |
| 2013/0231792 | A1 | 9/2013 | Ji et al. |

OTHER PUBLICATIONS

Lee et al., "Model-based demand-limiting control of building thermal mass", Science Direct Building and Environment, vol. 43, Issue 10, Oct. 2008, pp. 1633-1646.

Lee et al., Development of Methods for Determining Demand-Limiting Setpoint Trajectories in Buildings Using Short-Term Measurements, Elsevier Ltd., www.sciencedirect.com, 2008, 14 pages.

Notice of Allowance on U.S. Appl. No. 13/396,514 dated Feb. 18, 2014, 12 pages.

Office Action on U.S. Appl. No. 13/251,134 Dated Jan. 24, 2014, 14 pages.

Preliminary Amendment for U.S. Appl. No. 13/396,514, mail date Feb. 27, 2012, 3 pages.

Sun et al., "A demand limiting strategy for maximizing monthly cost savings of commercial buildings", Science Direct Energy and Buildings, vol. 42, Issue 11, Nov. 2010, pp. 2219-2230.

Truong et al., "Modelling and short-term forecasting of daily peak power demand in Victoria using two-dimensional wavelet based SOP models", Science Direct International Journal of Electrical Power & Energy Systems, vol. 30, Issue 9, Nov. 2008, pp. 511-518.

Notice of Allowance on U.S. Appl. No. 14/493,053, mail date Dec. 18, 2015, 11 pages.

* cited by examiner

FIG. 4D

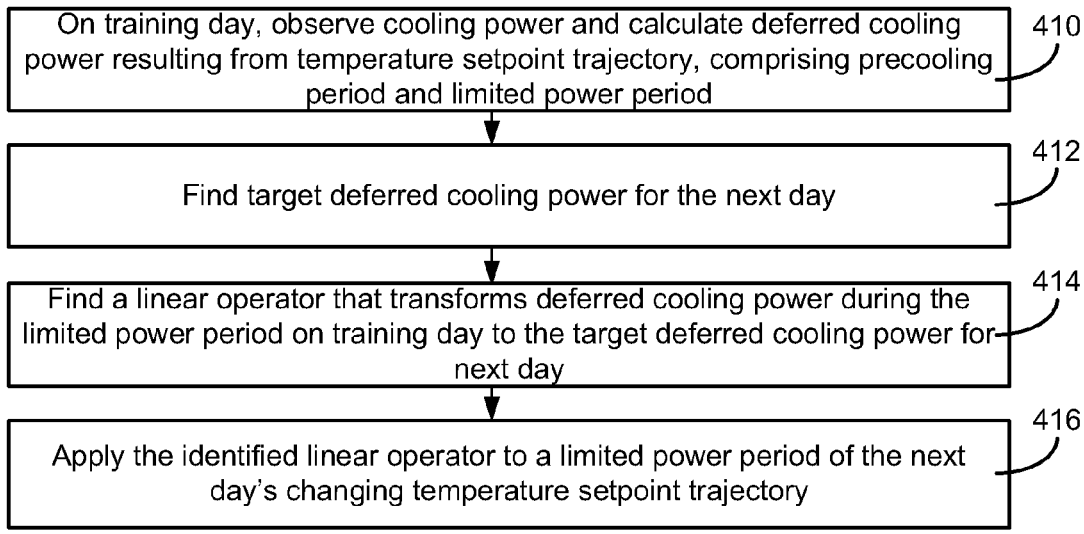

410 — On training day, observe cooling power and calculate deferred cooling power resulting from temperature setpoint trajectory, comprising precooling period and limited power period 412 — Find target deferred cooling power for the next day 414 — Find a linear operator that transforms deferred cooling power during the limited power period on training day to the target deferred cooling power for next day 416 — Apply the identified linear operator to a limited power period of the next day's changing temperature setpoint trajectory

FIG. 4E

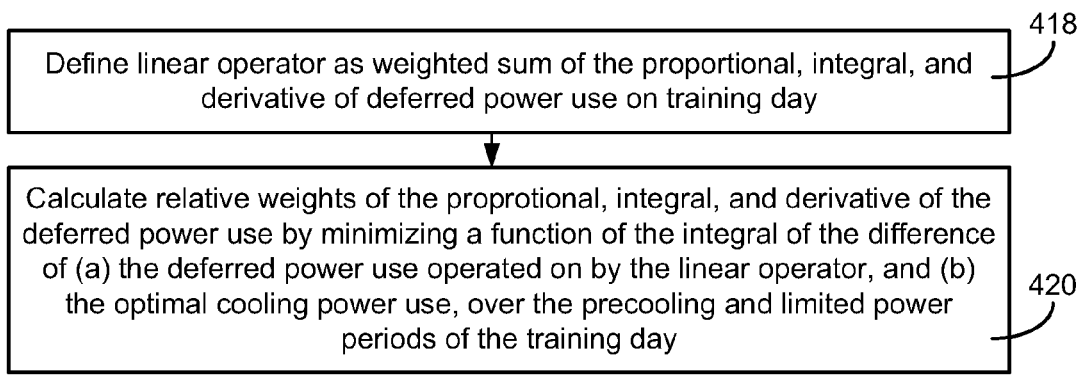

418 — Define linear operator as weighted sum of the proportional, integral, and derivative of deferred power use on training day 420 — Calculate relative weights of the proprotional, integral, and derivative of the deferred power use by minimizing a function of the integral of the difference of (a) the deferred power use operated on by the linear operator, and (b) the optimal cooling power use, over the precooling and limited power periods of the training day

FIG. 4F

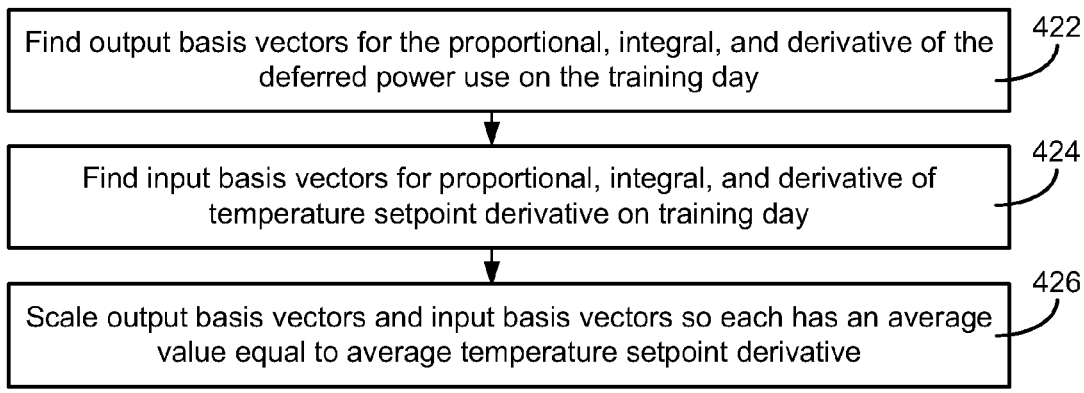

422 — Find output basis vectors for the proportional, integral, and derivative of the deferred power use on the training day 424 — Find input basis vectors for proportional, integral, and derivative of temperature setpoint derivative on training day 426 — Scale output basis vectors and input basis vectors so each has an average value equal to average temperature setpoint derivative

SYSTEMS AND METHODS FOR CONTROLLING ENERGY USE IN A BUILDING MANAGEMENT SYSTEM USING ENERGY BUDGETS

CROSS-REFERENCE TO RELATED APPLICATION

This application is a continuation of U.S. application Ser. No. 13/396,514, filed Feb. 14, 2012, which is a continuation-in-part of U.S. application Ser. No. 13/251,134, filed Sep. 30, 2011. The entireties of U.S. application Ser. No. 13/396,514 and U.S. application Ser. No. 13/251,134 are incorporated by reference herein.

BACKGROUND

The present invention relates generally to the field of building management systems. The present invention more particularly relates to systems and methods for integrating a building management system with smart grid components and data.

In a smart grid, the switching points in the grid, as well as several other points distributed throughout the grid, include microprocessor driven controls configured to automatically reconfigure the circuits and communicate bi-directional information. The communicated information can be carried over the power distribution grid itself or other communication mediums (e.g., wireless, optical, wired, etc.).

A smart grid is a key element of a comprehensive strategy to increase energy reliability and efficiency, reduce energy costs, and lower greenhouse gas emissions. The large portion of smart grid R&D efforts today are focused on creating the digital communications architecture and distribution management infrastructure connecting power plant and utility-scale energy resources with distributed meters. During peak usage times, demand limiting may be utilized to reduce the energy costs of operating a building's heating, ventilation, and air conditioning (HVAC), lighting, elevator, and other subsystems.

SUMMARY

One embodiment of the invention relates to a process for controlling power consumption of a cooling system during a limited power period of a day. The process includes using a controller of the cooling system to observe cooling power use resulting from a temperature setpoint trajectory. The temperature setpoint trajectory may comprise a pre-cooling period and a limited power period. The process further includes using a controller of the cooling system to calculate a deferred cooling power use resulting from a temperature setpoint trajectory of a first day. The deferred cooling power use may be identified by comparing the observed cooling power use to an expected cooling power use for a constant temperature setpoint during the limited power period. The process further includes finding a target deferred cooling power use. The process further includes finding a linear operator that transforms the deferred cooling power use observed during the limited power period to the target deferred cooling power use. The process further includes applying the linear operator to a changing temperature setpoint trajectory of the limited power period to create a temperature setpoint trajectory corresponding to the target cooling power use.

Another embodiment of the present invention relates to a controller of a HVAC system. The controller includes a processing circuit that is configured to observe cooling power use resulting from a temperature setpoint trajectory over a pre-cooling period and a limited power period. The processing circuit is further configured to compute a deferred cooling power use resulting from a temperature setpoint trajectory. The deferred cooling power use may be identified by comparing the observed cooling power use to an expected cooling power use for a constant temperature setpoint during the limited power period. The processing circuit is further configured to compute a target deferred cooling power use. The processing circuit is further configured to compute a linear operator that transforms the deferred cooling power use observed during the limited power period to the target deferred cooling power use. The processing circuit is further configured to apply the linear operator to a changing temperature setpoint trajectory of the limited power period to create a temperature setpoint trajectory corresponding to the target cooling power use.

BRIEF DESCRIPTION OF THE FIGURES

The disclosure will become more fully understood from the following detailed description, taken in conjunction with the accompanying figures, wherein like reference numerals refer to like elements, in which:

FIG. 4D is a flow diagram of a process for generating a temperature setpoint trajectory for one or more HVAC devices, according to an exemplary embodiment;

FIG. 4E is a more detailed flow diagram of a step in the process outlined in FIG. 4D that describes finding a mathematical linear operator that transforms a deferred power usage to an optimal deferred power usage, according to an exemplary embodiment;

FIG. 4F is a more detailed flow diagram of a step in the process outlined in FIG. 4E that describes the calculation of optimal weights for certain terms in the mathematical linear operator, according to an exemplary embodiment;

DETAILED DESCRIPTION OF THE EXEMPLARY EMBODIMENTS

The present invention relates to a building management system configured to improve building efficiency, to enable greater use of renewable energy sources, and to provide more comfortable and productive buildings.

A building management system (BMS) is, in general, hardware and/or software configured to control, monitor, and manage devices in or around a building or building area. BMS subsystems or devices can include heating, ventilation, and air conditioning (HVAC) subsystems or devices, security subsystems or devices, lighting subsystems or devices, fire alerting subsystems or devices, elevator subsystems or devices, other devices that are capable of managing building functions, or any combination thereof.

Figure 1A:
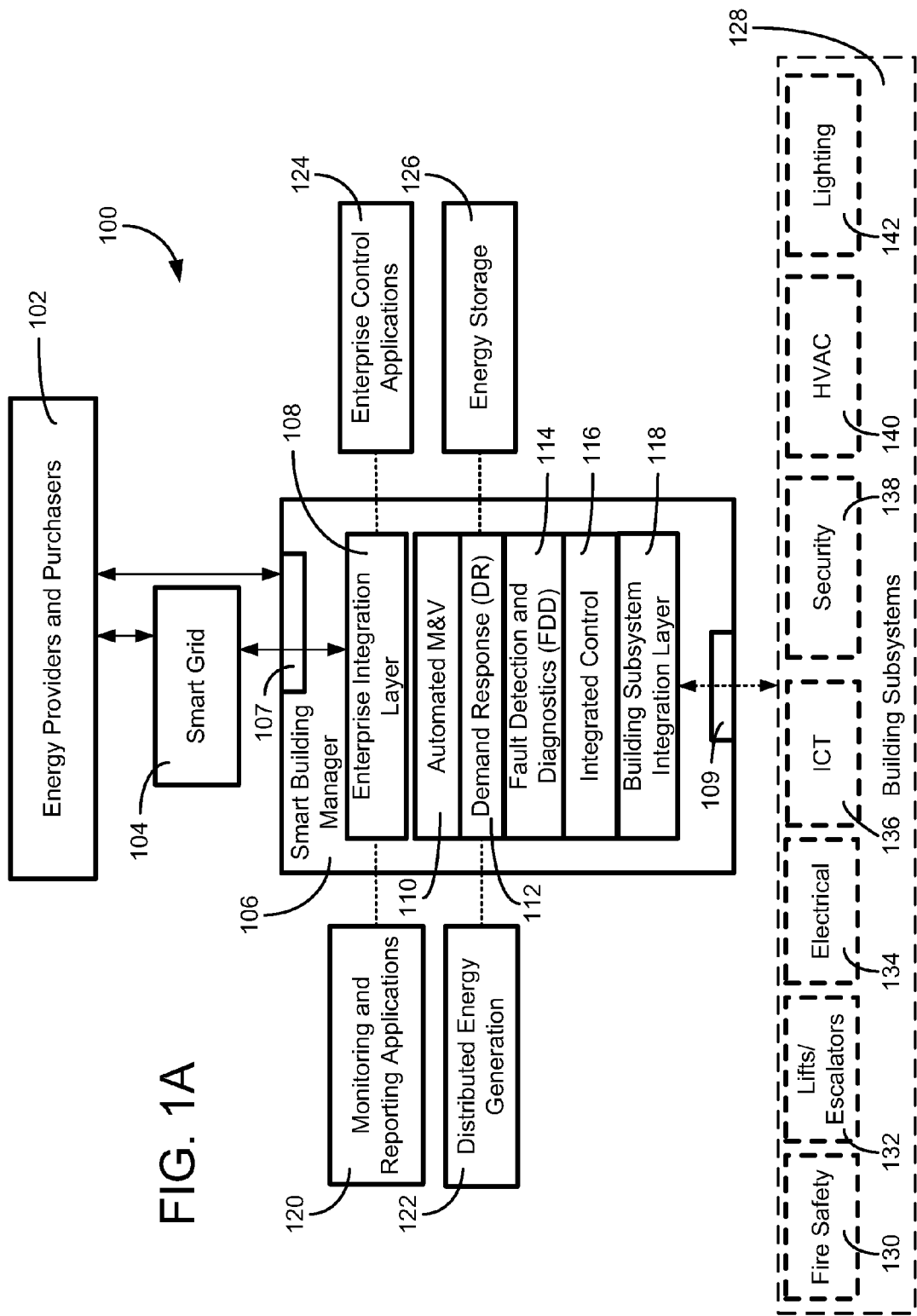
FIG. 1A is a block diagram of a building manager connected to a smart grid and a plurality of building subsystems, according to an exemplary embodiment.

Referring now to FIG. 1A, a block diagram of a system 100 including a smart building manager 106 is shown, according to an exemplary embodiment. Smart building manager 106 is connected to a smart grid 104 and a plurality of building subsystems 128. The building subsystems 128 may include a building electrical subsystem 134, an information communication technology (ICT) subsystem 136, a security subsystem 138, a HVAC subsystem 140, a lighting subsystem 142, a lift/escalators subsystem 132, and a fire safety subsystem 130. The building subsystems 128 can include fewer, additional, or alternative subsystems. For example, building subsystems 128 may also or alternatively include a refrigeration subsystem, an advertising or signage system subsystem, a cooking subsystem, a vending subsystem, or a printer or copy service subsystem. Conventionally these systems are autonomous and managed by separate control systems. Embodiments of the smart building manager described herein are configured to achieve energy consumption and energy demand reductions by integrating the management of the building subsystems.

Each of building subsystems 128 include any number of devices, controllers, and connections for completing their individual functions and control activities. For example, HVAC subsystem 140 may include a chiller, a boiler, any number of air handling units, economizers, field controllers, supervisory controllers, actuators, temperature sensors, or other devices for controlling the temperature within a building. As another example, lighting subsystem 142 may include any number of light fixtures, ballasts, lighting sensors, dimmers, or other devices configured to controllably adjust the amount of light provided to a building space. Security subsystem 138 may include occupancy sensors, video surveillance cameras, digital video recorders, video processing servers, intrusion detection devices, access control devices and servers, or other security-related devices.

In an exemplary embodiment, the smart building manager 106 is configured to include: a communications interface 107 to the smart grid 104 outside the building, an interface 109 to disparate subsystems 128 within a building (e.g., HVAC, lighting security, lifts, power distribution, business, etc.), and an interface to applications 120, 124 (network or local) for allowing user control, and the monitoring and adjustment of the smart building manager 106 or subsystems 128. Enterprise control applications 124 may be configured to provide subsystem-spanning control to a graphical user interface (GUI) or to any number of enterprise-level business applications (e.g., accounting systems, user identification systems, etc.). Enterprise control applications 124 may also or alternatively be configured to provide configuration GUIs for configuring the smart building manager 106. In yet other embodiments enterprise control applications 124 can work with layers 110-118 to optimize building performance (e.g., efficiency, energy use, comfort, or safety) based on inputs received at the interface 107 to the smart grid and the interface 109 to building subsystems 128. In an exemplary embodiment smart building manager 106 is integrated within a single computer (e.g., one server, one housing, etc.). In various other exemplary embodiments the smart building manager 106 can be distributed across multiple servers or computers (e.g., that can exist in distributed locations).

Figure 1B:
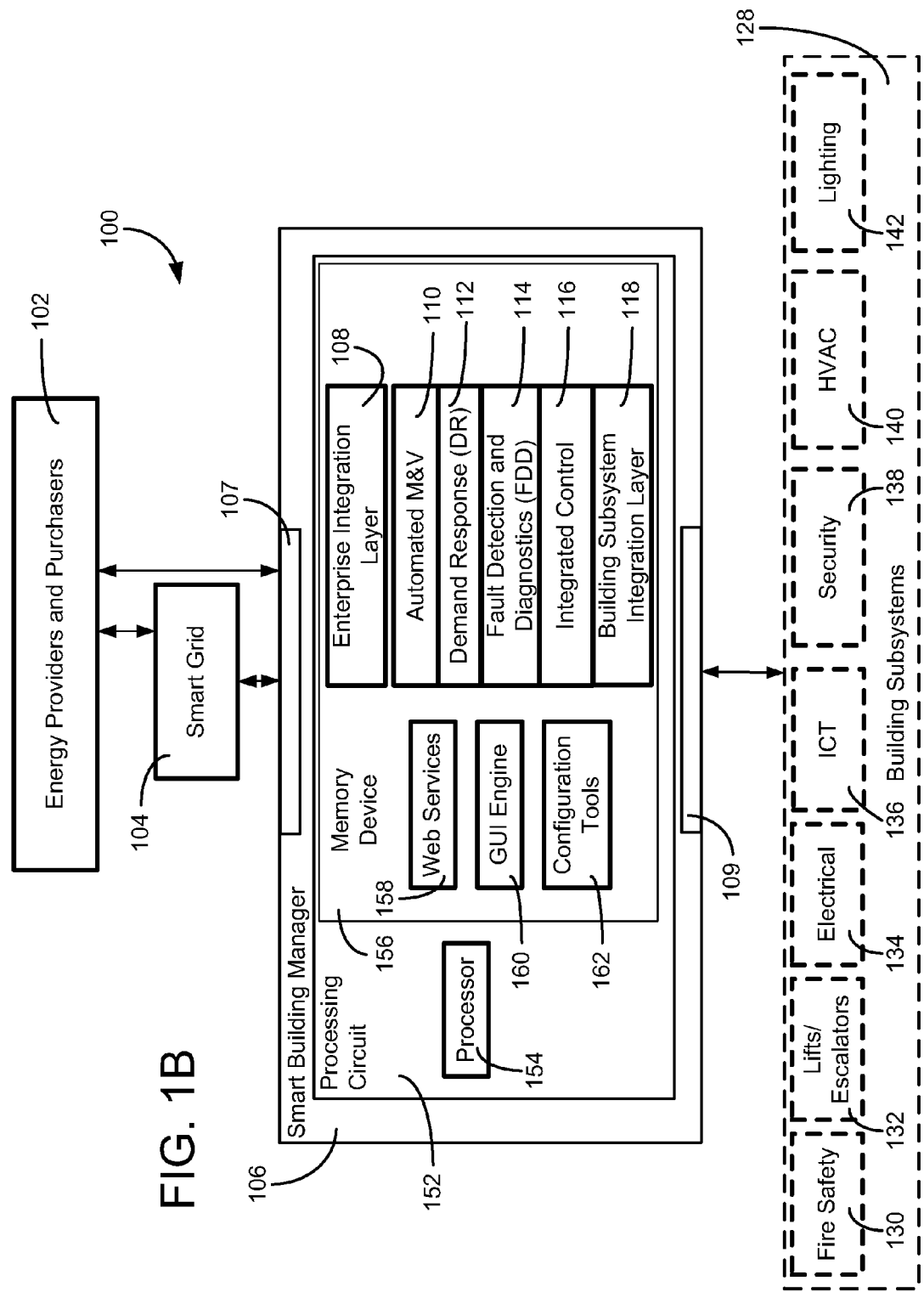
FIG. 1B is a more detailed block diagram of the building manager shown in FIG. 1A, according to an exemplary embodiment.

FIG. 1B illustrates a more detailed view of smart building manager 106, according to an exemplary embodiment. In particular, FIG. 1B illustrates smart building manager 106 as having a processing circuit 152. Processing circuit 152 is shown to include a processor 154 and memory device 156. Processor 154 can be implemented as a general purpose processor, an application specific integrated circuit (ASIC), one or more field programmable gate arrays (FPGAs), a group of processing components, or other suitable electronic processing components. Memory device 156 (e.g., memory, memory unit, storage device, etc.) is one or more devices (e.g., RAM, ROM, Flash memory, hard disk storage, etc.) for storing data and/or computer code for completing and/or facilitating the various processes, layers and modules described in the present application. Memory device 156 may be or include volatile memory or non-volatile memory. Memory device 156 may include database components, object code components, script components, or any other type of information structure for supporting the various activities and information structures described in the present application. According to an exemplary embodiment, memory device 156 is communicably connected to processor 154 via processing circuit 152 and includes computer code for executing (e.g., by processing circuit 152 and/or processor 154) one or more processes described herein.

Communications interfaces 107, 109 can be or include wired or wireless interfaces (e.g., jacks, antennas, transmitters, receivers, transceivers, wire terminals, etc.) for conducting data communications with, e.g., smart grid 104, energy providers and purchasers 102, building subsystems 128, or other external sources via a direct connection or a network connection (e.g., an Internet connection, a LAN, WAN, or WLAN connection, etc.). For example, communications interfaces 107, 109 can include an Ethernet card and port for sending and receiving data via an Ethernet-based communications link or network. In another example, communications interfaces 107, 109 can include a WiFi transceiver for communicating via a wireless communications network. In another example, one or both of interfaces 107, 109 may include cellular or mobile phone communications transceivers. In one embodiment communications interface 107 is a power line communications interface and communications interface 109 is an Ethernet interface. In other embodiments, both communications interface 107 and communications interface 109 are Ethernet interfaces or are the same Ethernet interface. Further, while FIG. 1A shows applications 120 and 124 as existing outside of smart building manager 106, in some embodiments applications 120 and 124 may be hosted within smart building manager 106 generally or memory device 156 more particularly.

Building Subsystem Integration Layer

Referring further to FIG. 1B, the building subsystem integration layer 118 is configured to manage communications between the rest of the smart building manager 106's components and the building subsystems. The building subsystem integration layer 118 may also be configured to manage communications between building subsystems. The building subsystem integration layer 118 may be configured to translate communications (e.g., sensor data, input signals, output signals, etc.) across a plurality of multi-vendor/multi-protocol systems. For example, the building subsystem integration layer 118 may be configured to integrate data from subsystems 128.

Figure 2:
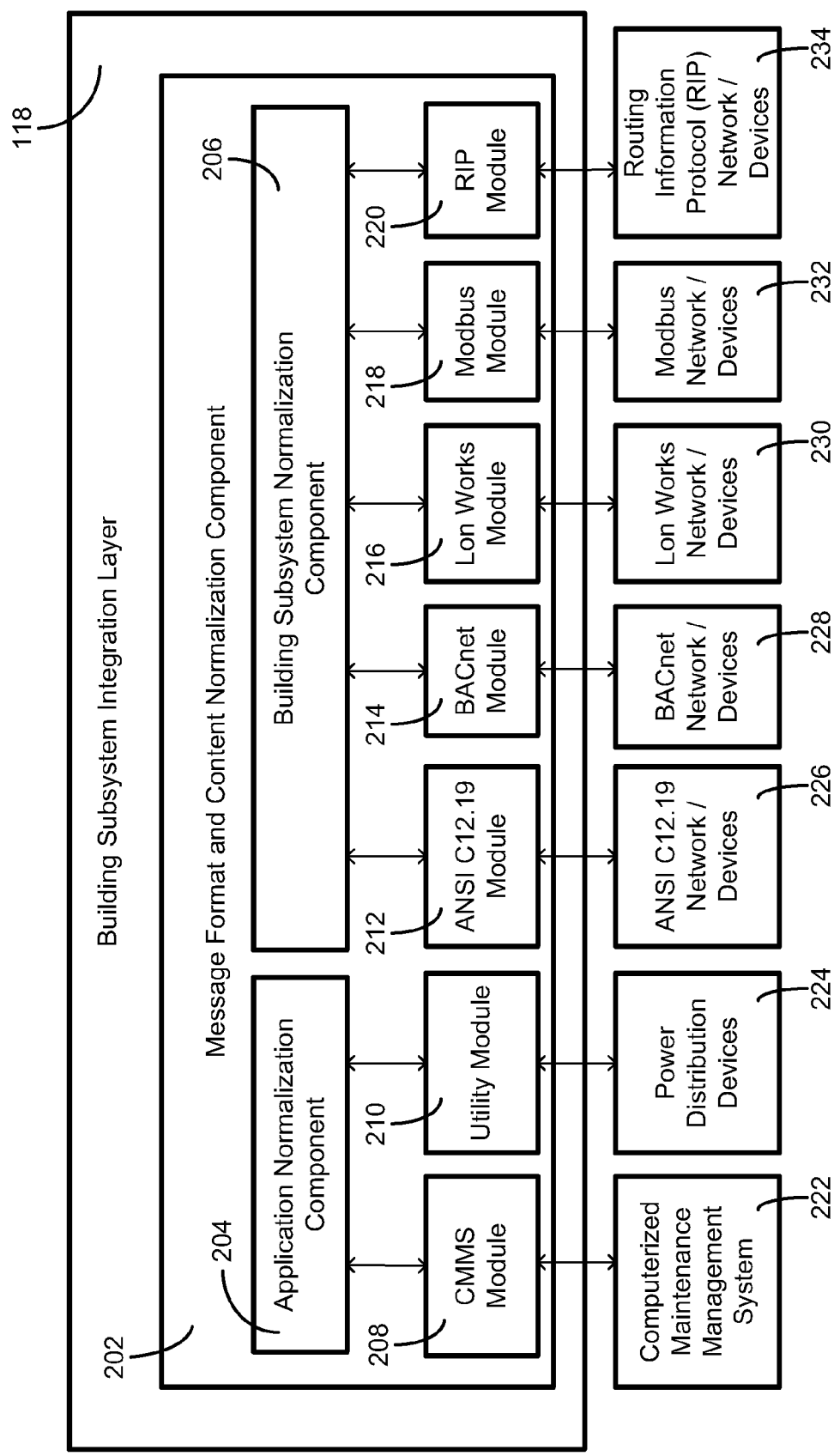
FIG. 2 is a block diagram of the building subsystem integration layer shown in FIG. 1A, according to an exemplary embodiment.

In FIG. 2, the building subsystem integration layer 118 is shown in greater detail to include a message format and content normalization component 202. The message format and content normalization component 202 is configured to convert data messages for and from disparately protocolled devices or networks (e.g., different building subsystems, differently protocolled smart-grid sources, etc.). The message format and content normalization component 202 is shown to include two subcomponents, an application normalization component 204 and a building subsystem normalization component 206. The application normalization component 204 is a computer function, object, service, or combination thereof configured to drive the conversion of communications for and from applications (e.g., enterprise level applications 120, 124 shown in FIG. 1A, a computerized maintenance management system 222, utility company applications via smart grid 104 shown in FIG. 1A, etc.). The building subsystem normalization component 206 is a computer function, object, service, or combination thereof configured to drive the conversion of communications for and from building subsystems (e.g., building subsystems 128 shown in FIG. 1A, building subsystem controllers, building devices, security systems, fire systems, etc.). The application normalization component 204 and the building subsystem normalization component 206 are configured to accommodate multiple communications or data protocols. In some embodiments, the application normalization component 204 and the building subsystem normalization component 206 are configured to conduct the conversion for each protocol based on information stored in modules 208-220 (e.g., a table, a script, in memory device 156 shown in FIG. 1B) for each of systems or devices 222-234. The protocol modules 208-220 may be, for example, schema maps or other descriptions of how a message for one protocol should be translated to a message for a second protocol. In some embodiments the modules 208-220 may be "plug-in" drivers that can be easily installed to or removed from a building subsystem integration layer 118 (e.g., via an executable installation routine, by placing a file in an interfaces folder, etc.) during setup. For example, modules 208-220 may be vendor specific (e.g., Johnson Controls, Honeywell, Siemens, etc.), standards-based (e.g., BACnet, ANSI C12.19, Lon Works, Modbus, RIP, SNMP, SOAP, web services, HTML, HTTP/HTTPS, XML, XAML, TFTP, DHCP, DNS, SMTP, SNTP, etc.), user built, user selected, and/or user customized. In some embodiments the application normalization component 204 or building subsystem normalization component 206 are configured for compatibility with new modules or drivers (e.g., user defined or provided by a vendor or third party). In such embodiments, message format and content normalization component 202 may advantageously be scaled for future applications or case-specific requirements (e.g., situations calling for the use of additional cyber security standards such as data encryption/decryption) by changing the active module set or by installing a new module.

Using message format and content normalization component 202, the building subsystem integration layer 118 can be configured to provide a service-oriented architecture for providing cross-subsystem control activities and cross-subsystem applications. The message format and content normalization component 202 can be configured to provide a relatively small number of straightforward interfaces (e.g., application programming interfaces (APIs)) or protocols (e.g., open protocols, unified protocols, common protocols) for use by layers 108-116 (shown in FIG. 1A) or external applications (e.g., 120, 124 shown in FIG. 1A) and to "hide" such layers or applications from the complexities of the underlying subsystems and their particular data transport protocols, data formats, semantics, interaction styles, and the like. Configuration of the message format and content normalization component 202 may occur automatically (e.g., via a building subsystem and device discovery process), via user configuration, or by a combination of automated discovery and user configuration. User configuration may be driven by providing one or more graphical user interfaces or "wizards" to a user, the graphical user interfaces allowing the user to map an attribute from one protocol to an attribute of another protocol. Configuration tool 162 shown in FIG. 1B may be configured to drive such an association process. The configuration tool 162 may be served to clients (local or remote) via web services 158 and/or GUI engine 160 (both shown in FIG. 1B). The configuration tool 162 may be provided as a thin web client (e.g., that primarily interfaces with web services 158) or a thick client (e.g., that only occasionally draws upon web services 158 and/or GUI engine 160). Configuration tool 162 may be configured to use a W3C standard intended to harmonize semantic information from different systems to controllably define, describe and store relationships between the data/protocols (e.g., define the modules 208-220). For example, the W3C standard used may be the Web Ontology Language (OWL). In some exemplary embodiments, configuration tool 162 may be configured to prepare the message format and content normalization component 202 (and device/protocol modules 208-220 thereof) for machine level interoperability of data content.

Once the building subsystem integration layer 118 is configured, developers of applications may be provided with a software development kit to allow rapid development of applications compatible with the smart building manager (e.g., with an application-facing protocol or API of the building subsystem integration layer). Such an API or application-facing protocol may be exposed at the enterprise integration layer 108 shown in FIGS. 1A and 1B. In various exemplary embodiments, the smart building manager 106 including building subsystem integration layer 118 includes the following features or advantages: seamless in that heterogeneous applications and subsystems may be integrated without varying or affecting the behavior of the external facing interfaces or logic; open in that it allows venders to develop products and applications by coding adapters (e.g. modules 208-220 shown in FIG. 2) or features according to a well-defined specification; multi-standard in that it supports subsystems that operate according to standards as well as proprietary protocols; extensible in that it accommodates new applications and subsystems with little to no modification; scalable in that it supports many applications and subsystems, adaptable in that it allows for the addition or deletion of applications or subsystems without affecting system consistency; user-configurable in that it is adjustable to changes in the business environment, business rules, or business workflows; and secure in that it protects information transferred through the integration channel. Additional details with respect to building subsystem integration layer 118 are described below with respect to FIG. 3.

Integrated Control Layer

Referring further to FIGS. 1A and 1B, the integrated control layer 116 is configured to use the data input and/or output of the building subsystem integration layer 118 to make control decisions. Due to the subsystem integration provided by the building subsystem integration layer 118, the integrated control layer 116 can integrate control activities of the subsystems 128 such that the subsystems 128 behave as a single integrated supersystem. In an exemplary embodiment the integrated control layer 116 includes control logic that uses inputs and outputs from a plurality of building subsystems to provide greater comfort and energy savings relative to the comfort and energy savings that separate subsystems could provide alone. For example, information from a first building subsystem may be used to control a second building subsystem. By way of a more particular example, when a building employee badges in at a parking garage, a message may be sent from the parking subsystem to the building subsystem integration layer 118, converted into an event recognized as a universal occupancy (e.g., "badge-in") event and provided to integrated control layer 116. Integrated control layer 116 may include logic that turns on the lights in the building employee's office, begins cooling the building employee's office in response to the anticipated occupancy, and boots up the employee's computer. The decision to turn the devices on is made by integrated control layer 116 and integrated control layer 116 may cause proper "on" commands to be forwarded to the particular subsystems (e.g., the lighting subsystem, the IT subsystem, the HVAC subsystem). The integrated control layer 116 passes the "on" commands through building subsystem integration layer 118 so that the messages are properly formatted or protocolled for receipt and action by the subsystems. As is illustrated in FIGS. 1A-B, the integrated control layer 116 is logically above the building subsystems and building subsystem controllers. The integrated control layer 116, by having access to information from multiple systems, is configured to use inputs from one or more building subsystems 128 to make control decisions for control algorithms of other building subsystems. For example, the "badge-in" event described above can be used by the integrated control layer 116 (e.g., a control algorithm thereof) to provide new setpoints to an HVAC control algorithm of the HVAC subsystem.

While conventional building subsystem controllers are only able to process inputs that are directly relevant to the performance of their own control loops, the integrated control layer 116 is configured to use an input from a first subsystem to make an energy-saving control decision for a second subsystem. Results of these decisions can be communicated back to the building subsystem integration layer 116 via, for example, the message format and content normalization component 202 shown in FIG. 2A. Therefore, advantageously, regardless of the particular HVAC system or systems connected to the smart building manager, and due to the normalization at the building subsystem integration layer 118, the integrated control layer's control algorithms can determine a control strategy using normalized temperature inputs, and provide an output including a normalized setpoint temperature to the building subsystem integration layer. The building subsystem integration layer 118 can translate the normalized setpoint temperature into a command specific to the building subsystem or controller for which the setpoint adjustment is intended. If multiple subsystems are utilized to complete the same function (e.g., if multiple disparately protocolled HVAC subsystems are provided in different regions of a building), the building subsystem integration layer 118 can convert a command decision (e.g., to lower the temperature setpoint by 2 degrees) to multiple different commands for receipt and action by the multiple disparately protocolled HVAC subsystems. In this way, functions of the integrated control layer 116 may be executed using the capabilities of building subsystem integration layer 118. In an exemplary embodiment, the integrated control layer is configured to conduct the primary monitoring of system and subsystem statuses and interrelationships for the building. Such monitoring can cross the major energy consuming subsystems of a building to allow for cross-subsystem energy savings to be achieved (e.g., by the demand response layer 112).

The integrated control layer 116 is shown to be logically below the demand response layer 112. The integrated control layer 116 is configured to enhance the effectiveness of the demand response layer 112 by enabling building subsystems 128 and their respective control loops to be controlled in coordination with the demand response layer 112. This configuration may advantageously provide much less disruptive demand response behavior than conventional systems. For example, the integrated control layer 116 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller. The integrated control layer 116 may also be configured to provide feedback to the demand response layer 112 so that the demand response layer 112 may check that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. The integrated control layer 116 is also logically below the fault detection and diagnostics (FDD) layer 114 and the automated measurement and validation layer 110. The integrated control layer may be configured to provide calculated inputs (e.g., aggregations) to these "higher levels" based on outputs from more than one building subsystem.

Control activities that may be completed by the integrated control layer 116 (e.g., software modules or control algorithms thereof) include occupancy-based control activities. Security systems such as radio frequency location systems (RFLS), access control systems, and video surveillance systems can provide detailed occupancy information to the integrated control layer 116 and other building subsystems 128 via the smart building manager 106 (and more particularly, via the building subsystem integration layer 118). Integration of an access control subsystem and a security subsystem for a building may provide detailed occupancy data for consumption by the integrated control layer 116 (e.g., beyond binary "occupied" or "unoccupied" data available to some conventional HVAC systems that rely on, for example, a motion sensor). For example, the exact number of occupants in the building (or building zone, floor, conference room, etc.) may be provided to the integrated control layer 116 or aggregated by the integrated control layer 116 using inputs from a plurality of subsystems. The exact number of occupants in the building can be used by the integrated control layer 116 to determine and command appropriate adjustments for building subsystems 128 (such as HVAC subsystem 140 or lighting subsystem 142). Integrated control layer 116 may be configured to use the number of occupants, for example, to determine how many of the available elevators to activate in a building. If the building is only 20% occupied, the integrated control layer 116, for example, may be configured to power down 80% of the available elevators for energy savings. Further, occupancy data may be associated with individual workspaces (e.g., cubicles, offices, desks, workstations, etc.) and if a workspace is determined to be unoccupied by the integrated control layer, a control algorithm of the integrated control layer 116 may allow for the energy using devices serving the workspace to be turned off or commanded to enter a low power mode. For example, workspace plug-loads, task lighting, computers, and even phone circuits may be affected based on a determination by the integrated control layer that the employee associated with the workspace is on vacation (e.g., using data inputs received from a human-resources subsystem). Significant electrical loads may be shed by the integrated control layer 116, including, for example, heating and humidification loads, cooling and dehumidification loads, ventilation and fan loads, electric lighting and plug loads (e.g. with secondary thermal loads), electric elevator loads, and the like. The integrated control layer 116 may further be configured to integrate an HVAC subsystem or a lighting subsystem with sunlight shading devices or other "smart window" technologies. Natural day-lighting can significantly offset lighting loads but for optimal comfort may be controlled by the integrated control layer to prevent glare or over-lighting. Conversely, shading devices and smart windows may also be controlled by the integrated control layer 116 to calculably reduce solar heat gains in a building space—which can have a significant impact on cooling loads. Using feedback from sensors in the space, and with knowledge of the HVAC control strategy, the integrated control layer 116 may further be configured to control the transmission of infrared radiation into the building, minimizing thermal transmission when the HVAC subsystem is cooling and maximizing thermal transmission when the HVAC subsystem is heating. As a further example of an occupancy-based control strategy that may be implemented by the integrated control layer 116, inputs from a video security subsystem may be analyzed by a control algorithm of the integrated control layer 116 to make a determination regarding occupancy of a building space. Using the determination, the control algorithm may turn off the lights, adjust HVAC set points, power-down ICT devices serving the space, reduce ventilation, and the like—enabling energy savings with an acceptable loss of comfort to occupants of the building space.

Figure 3:
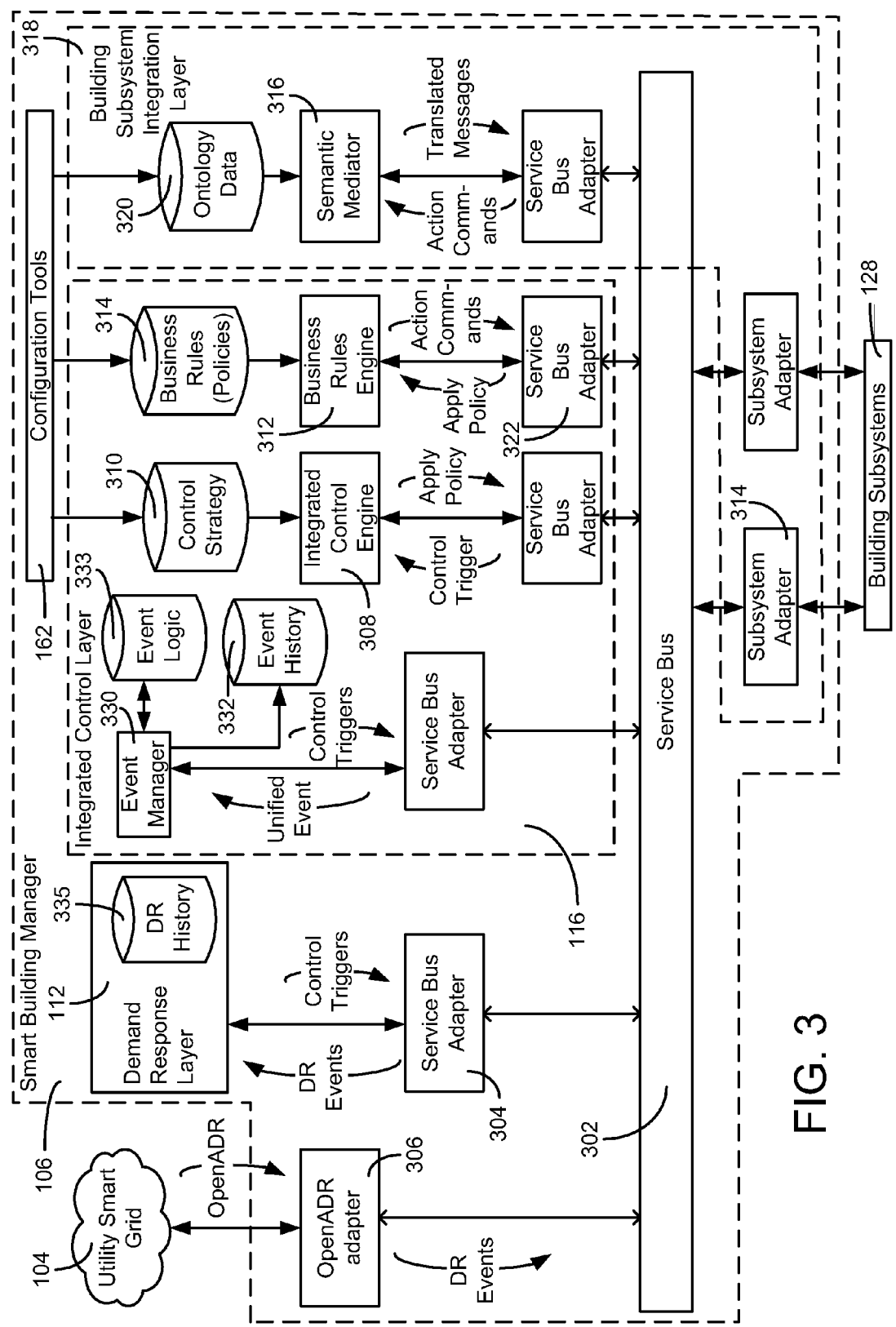
FIG. 3 is a detailed diagram of a portion of a smart building manager as shown in FIGS. 1A and 1B, according to an exemplary embodiment.

Referring now to FIG. 3, a detailed diagram of a portion of smart building manager 106 is shown, according to an exemplary embodiment. In particular, FIG. 3 illustrates a detailed embodiment of integrated control layer 116. Configuration tools 162 can allow a user to define (e.g., via graphical user interfaces, via prompt-driven "wizards", etc.) how the integrated control layer 116 should react to changing conditions in the building subsystems 128. In an exemplary embodiment configuration tools 162 allow a user to build and store condition-response scenarios that can cross multiple building subsystems and multiple enterprise control applications (e.g., work order management system applications, entity resource planning (ERP) applications, etc.).

Building subsystems 128, external sources such as smart grid 104, and internal layers such as demand response layer 112 can regularly generate events (e.g., messages, alarms, changed values, etc.) and provide the events to integrated control layer 116 or another layer configured to handle the particular event. For example, demand response (DR) events (e.g., a change in real time energy pricing) may be provided to smart building manager 106 as Open Automated Demand Response ("OpenADR") messages (a protocol developed by Lawrence Berkeley National Laboratories). The DR messages may be received by OpenADR adapter 306 (which may be a part of enterprise application layer 108 shown in FIGS. 1A and 1B). The OpenADR adapter 306 may be configured to convert the OpenADR message into a DR event configured to be understood (e.g., parsed, interpreted, processed, etc.) by demand response layer 112. The DR event may be formatted and transmitted according to or via a service bus 302 for the smart building manager 106.

Service bus adapter 304 may be configured to "trap" or otherwise receive the DR event on the service bus 302 and forward the DR event on to demand response layer 112. Service bus adapter 304 may be configured to queue, mediate, or otherwise manage demand response messages for demand response layer 112. Once a DR event is received by demand response layer 112, logic thereof can generate a control trigger in response to processing the DR event. The integrated control engine 308 of integrated control layer 116 is configured to parse the received control trigger to determine if a control strategy exists in control strategy database 310 that corresponds to the received control trigger. If a control strategy exists, integrated control engine 308 executes the stored control strategy for the control trigger. In some cases the output of the integrated control engine 308 will be an "apply policy" message for business rules engine 312 to process. Business rules engine 312 may process an "apply policy" message by looking up the policy in business rules database 314. A policy in business rules database 314 may take the form of a set of action commands for sending to building subsystems 128. The set of action commands may include ordering or scripting for conducting the action commands at the correct timing, ordering, or with other particular parameters. When business rules engine 312 processes the set of action commands, therefore, it can control the ordering, scripting, and other parameters of action commands transmitted to the building subsystems 128.

Action commands may be commands for relatively direct consumption by building subsystems 128, commands for other applications to process, or relatively abstract cross-subsystem commands. Commands for relatively direct consumption by building subsystems 128 can be passed through service bus adapter 322 to service bus 302 and to a subsystem adapter 314 for providing to a building subsystem in a format particular to the building subsystem. Commands for other applications to process may include commands for a user interface application to request feedback from a user, a command to generate a work order via a computerized maintenance management system (CMMS) application, a command to generate a change in an ERP application, or other application level commands.

More abstract cross-subsystem commands may be passed to a semantic mediator 316 which performs the task of translating those actions to the specific commands required by the various building subsystems 128. For example, a policy might contain an abstract action to "set lighting zone X to maximum light." The semantic mediator 316 may translate this action to a first command such as "set level to 100% for lighting object O in controller C" and a second command of "set lights to on in controller Z, zone_id_no 3141593." In this example both lighting object O in controller C and zone_id_no 3141593 in controller Z may affect lighting in zone X. Controller C may be a dimming controller for accent lighting while controller Z may be a non-dimming controller for the primary lighting in the room. The semantic mediator 316 is configured to determine the controllers that relate to zone X using ontology database 320. Ontology database 320 stores a representation or representations of relationships (the ontology) between building spaces and subsystem elements and subsystems elements and concepts of the integrated building supersystem. Using the ontology stored in ontology database 320, the semantic mediator can also determine that controller C is dimming and requires a numerical percentage parameter while controller Z is not dimming and requires only an on or off command. Configuration tool 162 can allow a user to build the ontology of ontology database 320 by establishing relationships between subsystems, building spaces, input/output points, or other concepts/objects of the building subsystems and the building space.

Events other than those received via OpenADR adapter 306, demand response layer 112, or any other specific event-handing mechanism can be trapped by subsystem adapter 314 (a part of building integration subsystem layer 318) and provided to a general event manager 330 via service bus 302 and a service bus adapter. By the time an event from a building subsystem 128 is received by event manager 330, it may have been converted into a unified event (i.e., "common event," "standardized event", etc.) by subsystem adapter 314 and/or other components of building subsystem integration layer 318 such as semantic mediator 316. The event manager 330 can utilize an event logic DB to lookup control triggers, control trigger scripts, or control trigger sequences based on received unified events. Event manager 330 can provide control triggers to integrated control engine 308 as described above with respect to demand response layer 112. As events are received they may be archived in event history 332 by event manager 330. Similarly, demand response layer 112 can store DR events in DR history 335. One or both of event manager 330 and demand response layer 112 may be configured to wait until multi-event conditions are met (e.g., by processing data in history as new events are received). For example, demand response layer 112 may include logic that does not act to reduce energy loads until a series of two sequential energy price increases are received. In an exemplary embodiment event manager 330 may be configured to receive time events (e.g., from a calendaring system). Different time events can be associated with different triggers in event logic database 333.

In an exemplary embodiment the configuration tools 162 can be used to build event conditions or trigger conditions in event logic 333 or control strategy database 310. For example, the configuration tools 162 can provide the user with the ability to combine data (e.g., from subsystems, from event histories) using a variety of conditional logic. In varying exemplary embodiments the conditional logic can range from simple logical operators between conditions (e.g., AND, OR, XOR, etc.) to pseudo-code constructs or complex programming language functions (allowing for more complex interactions, conditional statements, loops, etc.). The configuration tools 162 can present user interfaces for building such conditional logic. The user interfaces may allow users to define policies and responses graphically. In some embodiments the user interfaces may allow a user to select a pre-stored or pre-constructed policy and adapt it or enable it for use with their system.

Referring still to FIG. 3, in some embodiments integrated control layer 116 generally and integrated control engine 308 can operate as a "service" that can be used by higher level layers of smart building manager 106, enterprise applications, or subsystem logic whenever a policy or sequence of actions based on the occurrence of a condition is to be performed. In such embodiments control operations do not need to be reprogrammed—applications or logic can rely on the integrated control layer 116 to receive an event and to execute the related subsystem functions. For example, demand response layer 112, fault detection and diagnostics layer 114 (shown in FIGS. 1A and 1B), enterprise integration 108, and applications 120, 124 may all utilize a shared control strategy 310 and integrated control engine 308 in initiate response sequences to events.

Demand Response Layer

FIGS. 1A and 1B are further shown to include a demand response (DR) layer 112. The DR layer 112 is configured to optimize electrical demand in response to time-of-use prices, curtailment signals, or energy availability. Data regarding time-of-use prices, energy availability, and curtailment signals may be received from the smart grid 104, from energy providers and purchasers 102 (e.g., an energy aggregator) via the smart grid 104, from energy providers and purchasers 102 via a communication network apart from the smart grid, from distributed energy generation systems 122, from energy storage banks 126, or from other sources. According to an exemplary embodiment, the DR layer 112 includes control logic for responding to the data and signals it receives. These responses can include communicating with the control algorithms in the integrated control layer 116 to "load shed," changing control strategies, changing setpoints, or shutting down building devices or subsystems in a controlled manner. The architecture and process for supporting DR events is shown in and described with reference to FIG. 3. The DR layer 112 may also include control logic configured to determine when to utilize stored energy based on information from the smart grid and information from a local or remote energy storage system. For example, when the DR layer 112 receives a message indicating rising energy prices during a future "peak use" hour, the DR layer 112 can decide to begin using power from the energy storage system just prior to the beginning of the "peak use" hour.

In some exemplary embodiments the DR layer 112 may include a control module configured to actively initiate control actions (e.g., automatically changing setpoints) which minimize energy costs based on one or more inputs representative of or based on demand (e.g., price, a curtailment signal, a demand level, etc.). The DR layer 112 may further include or draw upon one or more DR policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the DR policy definitions can specify which equipment may be turned on or off in response to particular demand inputs, how long a system or piece of equipment should be turned off, what setpoints can be changed, what the allowable set point adjustment range is, how long to hold a "high demand" setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.). One or more of the policies and control activities may be located within control strategy database 310 or business rules database 314. Further, as described above with reference to FIG. 3, some of the DR responses to events may be processed and completed by integrated control layer 116 with or without further inputs or processing by DR layer 112.

A plurality of market-based DR inputs and reliability based DR inputs may be configured (e.g., via the DR policy definitions or other system configuration mechanisms) for use by the DR layer 112. The smart building manager 106 may be configured (e.g., self-configured, manually configured, configured via DR policy definitions, etc.) to select, deselect or differently weigh varying inputs in the DR layer's calculation or execution of control strategies based on the inputs. DR layer 112 may automatically (and/or via the user configuration) calculate outputs or control strategies based on a balance of minimizing energy cost and maximizing comfort. Such balance may be adjusted (e.g., graphically, via rule sliders, etc.) by users of the smart building manager via a configuration utility or administration GUI.

The DR layer 112 may be configured to receive inputs from other layers (e.g., the building subsystem integration layer, the integrated control layer, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like from inside the system, from the smart grid 104, or from other remote sources.

Some embodiments of the DR layer 112 may utilize industry standard "open" protocols or emerging National Institute of Standards and Technology (NIST) standards to receive real-time pricing (RTP) or curtailment signals from utilities or power retailers. In other embodiments, proprietary protocols or other standards may be utilized. As mentioned above, in some exemplary embodiments, the DR layer 112 is configured to use the OpenADR protocol to receive curtailment signals or RTP data from utilities, other independent system operators (ISOs), or other smart grid sources. The DR layer 112, or another layer (e.g., the enterprise integration layer) that serves the DR layer 112 may be configured to use one or more security schemes or standards such as the Organization for the Advancement of Structured Information Standards (OASIS) Web Service Security Standards to provide for secure communications to/from the DR layer 112 and the smart grid 104 (e.g., a utility company's data communications network). If the utility does not use a standard protocol (e.g., the OpenADR protocol), the DR layer 112, the enterprise integration layer 108, or the building subsystem integration layer 118 may be configured to translate the utility's protocol into a format for use by the utility. The DR layer 112 may be configured to bi-directionally communicate with the smart grid 104 or energy providers and purchasers 102 (e.g., a utility, an energy retailer, a group of utilities, an energy broker, etc.) to exchange price information, demand information, curtailable load calculations (e.g., the amount of load calculated by the DR layer to be able to be shed without exceeding parameters defined by the system or user), load profile forecasts, and the like. DR layer 112 or an enterprise application 120, 124 in communication with the DR layer 112 may be configured to continuously monitor pricing data provided by utilities/ISOs across the nation, to parse the useful information from the monitored data, and to display the useful information to a user to or send the information to other systems or layers (e.g., integrated control layer 116).

The DR layer 112 may be configured to include one or more adjustable control algorithms in addition to or as an alternative from allowing the user creation of DR profiles. For example, one or more control algorithms may be automatically adjusted by the DR layer 112 using dynamic programming or model predictive control modules. In one embodiment business rules engine 312 is configured to respond to a DR event by adjusting a control algorithm or selecting a different control algorithm to use (e.g., for a lighting system, for an HVAC system, for a combination of multiple building subsystems, etc.).

The smart building manager 106 (e.g., using the demand response layer 112) can be configured to automatically (or with the help of a user) manage energy spend. The smart building manager 106 (with input from the user or operating using pre-configured business rules shown in FIG. 3) may be configured to accept time-of-use pricing signals or information from a smart grid (e.g., an energy provider, a smart meter, etc.) and, using its knowledge of historical building system data, control algorithms, calendar information, and/or weather information received from a remote source, may be configured to conduct automatic cost forecasting. The smart building manager 106 (e.g., the demand response layer 112) may automatically (or with user approval) take specific load shedding actions or control algorithm changes in response to different cost forecasts.

The smart building manager 106 may also be configured to monitor and control energy storage systems 126 (e.g., thermal, electrical, etc.) and distributed generation systems 122 (e.g., a solar array for the building, etc.). The smart building manager 106 or DR layer 112 may also be configured to model utility rates to make decisions for the system. All of the aforementioned processing activities or inputs may be used by the smart building manager 106 (and more particularly, a demand response layer 112 thereof) to limit, cap, profit-from, or otherwise manage the building or campus's energy spend. For example, using time-of-use pricing information for an upcoming hour that indicates an unusually high price per kilowatt hour, the system may use its control of a plurality of building systems to limit cost without too drastically impacting occupant comfort. To make such a decision and to conduct such activity, the smart building manager 106 may use data such as a relatively high load forecast for a building and information that energy storage levels or distributed energy levels are low. The smart building manager 106 may accordingly adjust or select a control strategy to reduce ventilation levels provided to unoccupied areas, reduce server load, raise a cooling setpoint throughout the building, reserve stored power for use during the expensive period of time, dim lights in occupied areas, turn off lights in unoccupied areas, and the like.

The smart building manager 106 may provide yet other services to improve building or grid performance. For example, the smart building manager 106 may provide for expanded user-driven load control (allowing a building manager to shed loads at a high level of system/device granularity). The smart building manager 106 may also monitor and control power switching equipment to route power to/from the most efficient sources or destinations. The smart building manager 106 may communicate to the power switching equipment within the building or campus to conduct "smart" voltage regulation. For example, in the event of a brownout, the smart building manager 106 may prioritize branches of a building's internal power grid—tightly regulating and ensuring voltage to high priority equipment (e.g., communications equipment, data center equipment, cooling equipment for a clean room or chemical factory, etc.) while allowing voltage to lower priority equipment to dip or be cut off by the smart grid (e.g., the power provider). The smart building manager 106 or the DR layer 112 may plan these activities or proactively begin load shedding based on grid services capacity forecasting conducted by a source on the smart grid or by a local algorithm (e.g., an algorithm of the demand response layer). The smart building manager 106 or the DR layer 112 may further include control logic for purchasing energy, selling energy, or otherwise participating in a real-time or near real-time energy market or auction. For example, if energy is predicted to be expensive during a time when the DR layer 112 determines it can shed extra load or perhaps even enter a net-positive energy state using energy generated by solar arrays, or other energy sources of the building or campus, the DR layer 112 may offer units of energy during that period for sale back to the smart grid (e.g., directly to the utility, to another purchaser, in exchange for carbon credits, etc.).

In some exemplary embodiments, the DR layer 112 may also be configured to support a "Grid Aware" plug-in hybrid electric vehicle (PHEV)/electric vehicle charging system instead of (or in addition to) having the charging system in the vehicles be grid-aware. For example, in buildings that have vehicle charging stations (e.g., terminals in a parking lot for charging an electric or hybrid vehicle), the DR layer 112 can decide when to charge the vehicles (e.g., when to enable the charging stations, when to switch a relay providing power to the charging stations, etc.) based upon time, real time pricing (RTP) information from the smart grid, or other pricing, demand, or curtailment information from the smart grid. In other embodiments, each vehicle owner could set a policy that is communicated to the charging station and back to the DR layer 112 via wired or wireless communications that the DR layer 112 could be instructed to follow. The policy information could be provided to the DR layer 112 via an enterprise application 124, a vehicle information system, or a personal portal (e.g., a web site vehicle owner's are able to access to input, for example, at what price they would like to enable charging). The DR layer 112 could then activate the PHEV charging station based upon that policy unless a curtailment event is expected (or occurs) or unless the DR layer 112 otherwise determines that charging should not occur (e.g., decides that electrical storage should be conducted instead to help with upcoming anticipated peak demand). When such a decision is made, the DR layer 112 may pre-charge the vehicle or suspend charge to the vehicle (e.g., via a data command to the charging station). Vehicle charging may be restricted or turned off by the smart building manager during periods of high energy use or expensive energy. Further, during such periods, the smart building manager 106 or the DR layer 112 may be configured to cause energy to be drawn from plugged-in connected vehicles to supplement or to provide back-up power to grid energy.

Using the real time (or near real-time) detailed information regarding energy use in the building, the smart building manager 106 may maintain a greenhouse gas inventory, forecast renewable energy use, surpluses, deficits, and generation, and facilitate emission allocation, emission trading, and the like. Due to the detailed and real-time or near real-time nature of such calculations, the smart building manager 106 may include or be coupled to a micro-transaction emission trading platform.

The DR layer 112 may further be configured to facilitate the storage of on-site electrical or thermal storage and to controllably shift electrical loads from peak to off peak times using the stored electrical or thermal storage. The DR layer 112 may be configured to significantly shed loads during peak hours if, for example, high price or contracted curtailment signals are received, using the stored electrical or thermal storage and without significantly affecting building operation or comfort. The DR layer 112 may be configured to use a building pre-cooling algorithm in the night or morning. The DR layer 112 may be configured to rely on calculated thermal storage characteristics for the building in order to reduce peak demand for cooling (e.g., by relying on the pre-cooling). Further, the DR layer 112 may be configured to use inputs such as utility rates, type of cooling equipment, occupancy schedule, building construction, climate conditions, upcoming weather events, and the like to make control decisions (e.g., the extent to which to pre-cool, etc.).

Automated Measurement & Verification Layer

FIGS. 1A and 1B are further shown to include an automated measurement and validation layer 110 configured to evaluate building system (and subsystem) performance. The automated measurement and validation (AM&V) layer 110 may implement various methods or standards of the international performance measurement and validation (IPMVP) protocol. In an exemplary embodiment, the AM&V layer 110 is configured to automatically (e.g., using data aggregated by the AM&V layer 110, integrated control layer 116, building subsystem integration layer 118, FDD layer 114, or otherwise) verify the impact of the integrated control layer 116, the FDD layer 114, the DR layer 112, or other energy-saving strategies of the smart building manager 106. For example, the AM&V layer 110 may be used to validate energy savings obtained by capital intensive retrofit projects that are monitored or managed post retrofit by the smart building manager. The AM&V layer 110 may be configured to calculate, for example, a return on investment date, the money saved using pricing information available from utilities, and the like. The AM&V layer 110 may allow for user selection of the validation method(s) it uses. For example, the AM&V layer 110 may allow for the user to select IPMVP Option C which specifies a method for the direct comparison of monthly or daily energy use from a baseline model to actual data from the post-installation measurement period. IPMVP Option C, for example, may specify for adjustments to be made of the base-year energy model analysis to account for current year over base year changes in energy-governing factors such as weather, metering period, occupancy, or production volumes. The AM&V layer 110 may be configured to track (e.g., using received communications) the inputs for use by such a validation method at regular intervals and may be configured to make adjustments to an "adjusted baseline energy use" model against which to measure savings. The AM&V layer 110 may further allow for manual or automatic non-routine adjustments of factors such as changes to the facility size, building envelope, or major equipment. Algorithms according to IPMVP Option B or Option A may also or alternatively be used or included with the AM&V layer 110. IPMVP Option B and IPMVP Option A involve measuring or calculating energy use of a system in isolation before and after it is retrofitted. Using the building subsystem integration layer (or other layers of the BMS), relevant data may be stored and the AM&V layer 110 may be configured to track the parameters specified by IPMVP Option B or A for the computation of energy savings for a system in isolation (e.g., flow rates, temperatures, power for a chiller, etc.).

The AM&V layer 110 may further be configured to verify that control strategies commanded by, for example, the integrated control layer or the DR layer are working properly. Further, the AM&V layer 110 may be configured to verify that a building has fulfilled curtailment contract obligations. The AM&V layer 110 may further be configured as an independent verification source for the energy supply company (utility). One concern of the utility is that a conventional smart meter may be compromised to report less energy (or energy consumed at the wrong time). The AM&V layer 110 can be used to audit smart meter data (or other data used by the utility) by measuring energy consumption directly from the building subsystems or knowledge of building subsystem usage and comparing the measurement or knowledge to the metered consumption data. If there is a discrepancy, the AM&V layer may be configured to report the discrepancy directly to the utility. Because the AM&V layer may be continuously operational and automated (e.g., not based on a monthly or quarterly calculation), the AM&V layer may be configured to provide verification of impact (e.g., of demand signals) on a granular scale (e.g., hourly, daily, weekly, etc.). For example, the AM&V layer may be configured to support the validation of very short curtailment contracts (e.g., drop X kW/h over 20 minutes starting at 2:00 pm) acted upon by the DR layer 112. The DR layer 112 may track meter data to create a subhourly baseline model against which to measure load reductions. The model may be based on average load during a period of hours prior to the curtailment event, during the five prior uncontrolled days, or as specified by other contract requirements from a utility or curtailment service provider (e.g., broker). The calculations made by the AM&V layer 110 may be based on building system energy models and may be driven by a combination of stipulated and measured input parameters to estimate, calculate, apportion, and/or plan for load reductions resulting from the DR control activities.

The AM&V layer 110 may yet further be configured to calculate energy savings and peak demand reductions in accordance with standards, protocols, or best practices for enterprise accounting and reporting on greenhouse gas (GHG) emissions. An application may access data provided or calculated by the AM&V layer 110 to provide for web-based graphical user interfaces or reports. The data underlying the GUIs or reports may be checked by the AM&V layer 110 according to, for example, the GHG Protocol Corporate Accounting Standard and the GHG Protocol for Project Accounting. The AM&V layer 110 preferably consolidates data from all the potential sources of GHG emissions at a building or campus and calculates carbon credits, energy savings in dollars (or any other currency or unit of measure), makes adjustments to the calculations or outputs based on any numbers of standards or methods, and creates detailed accountings or inventories of GHG emissions or emission reductions for each building. Such calculations and outputs may allow the AM&V layer 110 to communicate with electronic trading platforms, contract partners, or other third parties in real time or near real time to facilitate, for example, carbon offset trading and the like.

The AM&V Layer 110 may be further configured to become a "smart electric meter" a or substitute for conventional electric meters. One reason the adoption rate of the "Smart Electric Grid" has conventionally been low is that the entire stock of installed electric meters needs to be replaced so that the meters will support Real Time Pricing (RTP) of energy and other data communications features. The AM&V layer 110 can collect interval-based electric meter data and store the data within the system. The AM&V layer 110 can also communicate with the utility to retrieve or otherwise receive Real Time Pricing (RTP) signals or other pricing information and associate the prices with the meter data. The utility can query this information from the smart building manager (e.g., the AM&V layer 110, the DR layer 112) at the end of a billing period and charge the customer using a RTP tariff or another mechanism. In this manner, the AM&V layer 110 can be used as a "Smart Electric Meter".

When the AM&V layer 110 is used in conjunction with the DR layer 112, building subsystem integration layer 118, and enterprise integration layer 108, the smart building manager 106 can be configured as an energy service portal (ESP). As an ESP, the smart building manager 106 may communicably or functionally connect the smart grid (e.g., energy supply company, utility, ISO, broker, etc.) network to the metering and energy management devices in a building (e.g., devices built into appliances such as dishwashers or other "smart" appliances). In other words, the smart building manager 106 may be configured to route messages to and from other data-aware (e.g., Real Time Pricing (RTP) aware, curtailment signal aware, pricing aware, etc.) devices and the energy supply company. In this configuration, building subsystems that are not RTP aware will be managed by the DR layer 112 while devices that are RTP aware can get signals directly from the utility. For example, if a vehicle (e.g., PHEV) is programmed to charge only when the price of electricity is below $0.1/ kWh, the PHEV can query the utility through the smart building manager and charge independently from the DR layer 112.

Enterprise Integration Layer

The enterprise integration layer 108 shown in FIG. 1A or FIG. 1B is configured to serve clients or local applications with information and services to support a variety of enterprise-level applications. The enterprise integration layer 108 may be configured to communicate (in real time or near real time) with the smart grid 104 and/or energy providers and purchasers 102. More particularly, in some embodiments the enterprise integration layer 108 may communicate with "smart meters," automated meter interfaces with utilities, carbon emission tracking and accounting systems, energy reporting systems, a building occupant interface, and traditional enterprise productivity applications (e.g., maintenance management systems, financial systems, workplace and supply chain management systems, etc.). The enterprise integration layer 108 may be configured to use protocols and methods as described above with respect to other layers or otherwise.

Building Occupant Interface

As indicated above, the enterprise integration layer 108 shown in FIG. 1B may be configured to exchange information with a building occupant interface application. In other exemplary embodiments the enterprise integration layer 108 serves the building occupant interface application to clients connecting to the enterprise integration layer 108, web services 158, and/or GUI engine 160. In yet other embodiments web services 158 may utilize GUI engine 160 for graphics rendering resources and enterprise integration layer 108 for data relating to the building occupant interface in order to provide the building occupant interface to client applications.

Communication and Security Features

Referring again to FIG. 3, the smart building manager may be configured to provide drivers for BACnet, LON, N2, Modbus, OPC, OBIX, MIG, SMTP, XML, Web services, and various other wireless communications protocols including Zigbee. These drivers may be implemented within or used by the service bus adapters or subsystem adapters. The service bus for the smart building manager may be configured to communicate using any number of smart grid communications standards. Such standards may be utilized for intra-manager communication as well as communication with a smart grid component (e.g., utility company, smart meter, etc.). For example, the smart building manager may be configured to use the ANSI C12.22/C12.19 protocol for some internal communications (e.g., DR events) as well as for communications with the smart grid. The service bus adapters and subsystem adapters convert received messages into a normalized messaging format for use on the service bus. In an exemplary embodiment the service bus is flexible, making use of IT-centric message queuing technologies (e.g., Open AMQ, MSMQ, and WebSphere MQ) to assure reliability, security, scalability, and performance. Service bus adapters enable layers and applications to communicate among one another and/or to the various in-building or external systems (e.g., via subsystem adapters). Stored communications rules may be used by the service bus adapters, subsystem adapters, or other components of the system to catch or correct communications failures. Communications and action-failure rules may also be configured for use by the action layers of the system. For example, the DR layer can check for whether an action requested or commanded by the DR layer has completed. If not, the DR layer can take a different action or a corrective action (e.g., turn off an alternate load, adjust additional setpoints, trigger a focused FDD activity, etc.) to ensure that DR needs are met. The smart building manager can also determine if someone has provided a DR override command to the system and take corrective action if available. If corrective action is unavailable, an appropriate message or warning may be sent to a DR partner (e.g., a utility co., an energy purchaser via the smart grid, etc.).

The smart building manager 106 may reside on (e.g., be connected to) an IP Ethernet network utilizing standard network infrastructure protocols and applications (e.g., DNS, DHCP, SNTP, SNMP, Active Directory, etc.) and can also be secured using IT security best practices for those standard network infrastructure protocols and applications. For example, in some embodiments the smart building manager may include or be installed "behind" infrastructure software or hardware such as firewalls or switches. Further, configurations in the smart building manager 106 can be used by the system to adjust the level of security of the smart building manager 106. For example, the smart building manager 106 (or particular components thereof) can be configured to allow its middle layers or other components to communicate only with each other, to communicate with a LAN, WAN, or Internet, to communicate with select devices having a building service, or to restrict communications with any of the above mentioned layers, components, data sources, networks, or devices. The smart building manager 106 may be configured to support a tiered network architecture approach to communications which may provide for some measure of security. Outward facing components are placed in a less secure "tier" of the network to act as a point of entry to/from the smart building manager 106. These outward facing components are minimized (e.g., a web server receives and handles all requests from client applications) which limits the number of ways the system can be accessed and provides an indirect communications route between external devices, applications, and networks and the internal layers or modules of the smart building manager 106. For example, "behind" the outward facing "first tier" may lie a more secure tier of the network that requires for authentication and authorization to occur at the first tier before functions of the more secure tier are accessed. The smart building manager 106 may be configured to include firewalls between such tiers or to define such tiers to protect databases or core components of the system from direct unauthorized access from outside networks.

In addition to including or implementing "infrastructure" type security measures as the type disclosed above, the smart building manager may be configured to include a communications security module configured to provide network message security between the smart building manager and an outside device or application. For example, if SOAP messaging over HTTP is used for communication at the enterprise integration layer, the SOAP messages may be concatenated to include an RC2 encrypted header containing authentication credentials. The authentication credentials may be checked by the receiving device (e.g., the smart building manager, the end application or device, etc.). In some embodiments the encrypted header may also contain information (e.g., bits) configured to identify whether the message was tampered with during transmission, has been spoofed, or is being "replayed" by an attacker. If a message does not conform to an expected format, or if any part of the authentication fails, the smart building manager may be configured to reject the message and any other unauthorized commands to the system. In some embodiments that use HTTP messages between the application and the smart building manager, the smart building manager may be configured to provide SSL for message content security (encryption) and/or Forms authentication for message authentication.

The smart building manager 106 may yet further include an access security module that requires any application to be authenticated with user credentials prior to logging into the system. The access security module may be configured to complete a secure authentication challenge, accomplished via a public or private key exchange (e.g., RSA keys) of a session key (e.g., an RC2 key), after a login with user credentials. The session key is used to encrypt the user credentials for the authentication challenge. After the authentication challenge, the session key is used to encrypt the security header of the messages. Once authenticated, user actions within the system are restricted by action-based authorizations and can be limited. For example, a user may be able to command and control HVAC points, but may not be able to command and control Fire and Security points. Furthermore, actions of a user within the smart building manager are written to memory via an audit trail engine, providing a record of the actions that were taken. The database component of the smart building manager 106 (e.g., for storing device information, DR profiles, configuration data, pricing information, or other data mentioned herein or otherwise) can be accessible via an SQL server that is a part of the building management server or located remotely from the smart building manager 106. For example, the database server component of the smart building manager 106 may be physically separated from other smart building manager components and located in a more secure tier of the network (e.g., behind another firewall). The smart building manager 106 may use SQL authentication for secure access to one or more of the aforementioned databases. Furthermore, in an exemplary embodiment the smart building manager can be configured to support the use of non-default instances of SQL and a non-default TCP port for SQL. The operating system of the smart building manager may be a Windows-based operating system.

Each smart building manager 106 may provide its own security and is not reliant on a central server to provide the security. Further, the same robustness of the smart building manager 106 that provides the ability to incorporate new building subsystem communications standards, modules, drivers and the like also allows it to incorporate new and changing security standards (e.g., for each module, at a higher level, etc.).

Multi-Campus/Multi-Building Energy Management

The smart building manager 106 shown in the Figures may be configured to support multi-campus or multi-building energy management services. Each of a plurality of campuses can include a smart building manager configured to manage the building, IT, and energy resources of each campus. In such an example, the building subsystems shown, e.g, in FIGS. 1A and 1B may be a collection of building subsystems for multiple buildings in a campus. The smart building manager may be configured to bi-directionally communicate with on-site power generation systems (e.g., distributed power sources, related services, solar arrays, fuel cell arrays, diesel generators, combined heat and power (CHP) systems, etc.), plug-in hybrid electric vehicle (PHEV) systems, and energy storage systems (e.g., stationary energy storage, thermal energy storage, etc.). Data inputs from such sources may be used by the demand and response layer of the smart building manager to make demand or response decisions and to provide other ancillary services to a connected smart grid (e.g., utility, smart meter connected to a utility, etc.) in real time or near real time. For example, the smart building manager may communicate with smart meters associated with an energy utility and directly or indirectly with independent systems operators (ISOs) which may be regional power providers. Using these communications, and its inputs from devices of the campus, the smart building manager (e.g., the demand response layer) is configured to engage in "peak shaving," "load shedding," or "load balancing" programs which provide financial incentives for reducing power draw during certain days or times of day. The demand response layer or other control algorithms of the smart building manager (e.g., control algorithms of the integrated control layer) may be configured to use weather forecast information to make setpoint or load shedding decisions (e.g., so that comfort of buildings in the campus is not compromised). The smart building manager may be configured to use energy pricing information, campus energy use information, or other information to optimize business transactions (e.g., the purchase of energy from the smart grid, the sale of energy to the smart grid, the purchase or sale of carbon credits with energy providers and purchasers, etc.). The smart building manager is configured to use the decisions and processing of the demand response layer to affect control algorithms of the integrated control layer.

While FIG. 1B is shown as a tightly-coupled smart building manager 106, in some embodiments the processing circuit of FIG. 1B (including the layers/modules thereof) may be distributed to different servers that together form the smart building manager having the control features described herein. In embodiments where the smart building manager 106 is controlling an entire campus or set of campuses, one or more smart building managers may be layered to effect hierarchical control activities. For example, an enterprise level smart building manager may provide overall DR strategy decisions to a plurality of lower level smart building managers that process the strategy decisions (e.g., using the framework shown in FIG. 3) to effect change at an individual campus or building. By way of further example, the "integrated control layer" 116 and the "building system integration layer" 118 may be replicated for each building and stored within lower level smart building servers while a single enterprise level smart building manager may provide a single higher level layer such the DR layer. Such a DR layer can execute a campus-wide DR strategy by passing appropriate DR events to the separate lower level smart building mangers having integrated control layers and building system integration layers. Higher level servers may provide software interfaces (APIs) to the one or more lower level servers so that the one or more lower level servers can request information from the higher level server, provide commands to the higher level server, or otherwise communicate with the layers or data of the higher level server. The reverse is also true, APIs or other software interfaces of the lower level servers may be exposed for consumption by the higher level server. The software interfaces may be web services interfaces, relational database connections, or otherwise.

Using Linear System Theory for Demand Response

As noted previously, the DR layer 112 may be configured to use a building pre-cooling algorithm in the night or morning and rely on the thermal storage characteristics of the building itself (i.e., storing energy in the thermal mass of the building) to reduce peak demand for cooling. In many regions, the cost of receiving electrical power from an energy provider depends not only on the actual consumption of power, but also on the building's peak demand during a particular time period. That is, the cost contains both an energy charge (price per kWh) and a demand charge (price per kW). In general, a building's peak demand corresponds to the maximum amount of power used by the building at any given time during a specified time period. For example, the total load on the power grid may be higher during certain times of the day. In such a case, the energy provider may charge a higher price for electricity during these times, or demand other taxes or surcharges, based on the user's peak demand.

The DR layer 112 may employ a demand limiting approach to flatten a building's demand profile, thus lowering its peak demand. This translates into cost savings for the operator of the building and also allows the energy provider to better predict overall demand for the smart grid. In some cases, power usage by certain devices in the building may be limited during a demand limiting period as part of a demand limiting strategy. In the context of HVAC and other building subsystems, it is advantageous for a demand limiting strategy to stop short of making habitation of the building uncomfortable. For example, a smart building manager having a demand limiting feature may constrain temperature inside of the building to a particular range during the demand limiting period, in order to ensure that the temperature stays within a specified comfort region.

Referring now to FIGS. 4A-4F, a process for controlling power consumption of a cooling system of a building is illustrated, according to an exemplary embodiment. The process uses a linear system to determine a setpoint trajectory to apply on the next demand limiting day. Where the setpoint trajectory is the series of temperature setpoints during the day, the process involves setting the setpoint trajectory such that it is estimated to minimize cooling cost during the demand limiting period. Once the setpoint trajectory is set, in some embodiments it is not adjusted throughout the day. Rather, in such embodiments, open loop control is being used. Even in many of the 'open loop' embodiments, however, the temperature may be constrained from floating or moving too high.

Figure 4A:
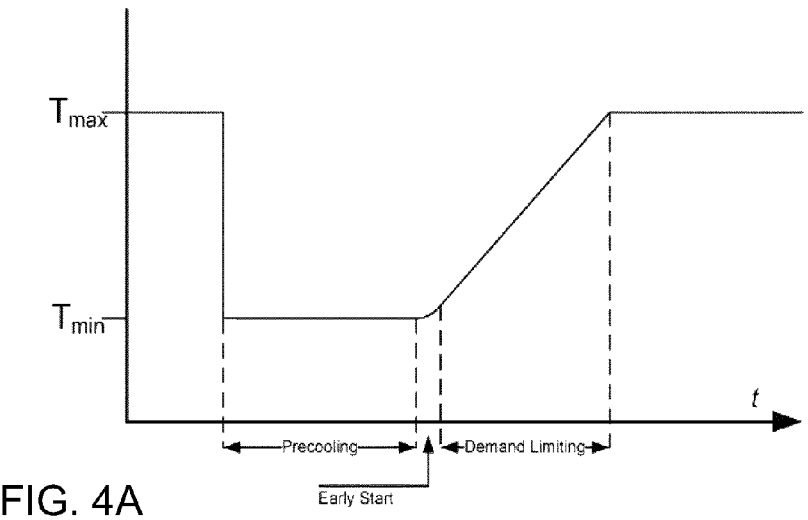
FIG. 4A is plot of temperature setpoint as a function of time, according to an exemplary embodiment.
Figure 4B:
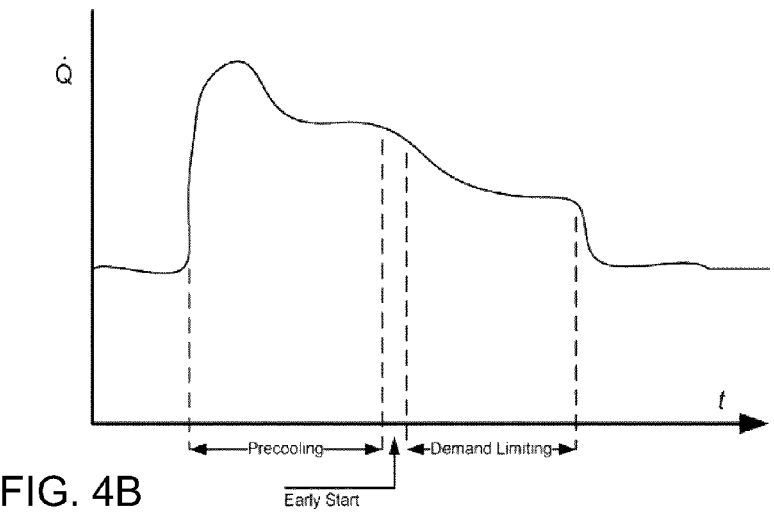
FIG. 4B is a plot of observed power use, as function of time, resulting from the temperature setpoint trajectory in FIG. 4A, according to an exemplary embodiment.

The process illustrated in FIGS. 4A-4F begins with conducting at least one training day. Conducting the training day includes using a predetermined setpoint trajectory to cool the system. The predetermined setpoint trajectory may look like the trajectory shown in FIG. 4A, including a pre-cooling period and a demand limiting period. FIG. 4B shows the heat transfer rate or power output ($Q$) for the day that results from the predetermined setpoint trajectory. The pre-cooling period is used so that the period of greatest energy use occurs prior to the demand limiting period. When the temperature setpoint is low (FIG. 4A), as during the pre-cooling period, the greatest amount of energy use occurs (FIG. 4B). In the demand limiting period (when energy may be expensive), the temperature setpoint in the building is increased. Thus, during the demand limiting period, the temperature is allowed to rise. An optimal setpoint trajectory may result in the actual temperature reaching a maximum (for comfort reasons) just as the demand limiting period ends; refraining from allowing the temperature to become uncomfortable while refraining from cooling more than is necessary. In this discussion, the heat transfer rate or power output is variously referred to as the power use or cooling power use. Limited power period and demand limiting period are used interchangeably.

FIGS. 4A-4B illustrate the effect of a demand limiting setpoint trajectory on the power use during the day. Energy use is high during the pre-cooling period due to the low temperature setpoint, but it is lower during the demand limiting period when the temperature setpoint is increasing. Using the response that is observed during a training day or another demand limiting day, the process includes finding a linear operator $\mathcal{L}$ that can be used to transform the setpoint trajectory of previous days to a new setpoint trajectory, which will cause the power use to follow an optimal value.

The use of a linear operator $\mathcal{L}$ to find an optimal setpoint trajectory relies on the linear system principle that, in general, if an input-output pair of a linear time-invariant system is known, then response of the system to a transformed version of the input can be predicted by performing the same transformation to the output.

Figure 4C:
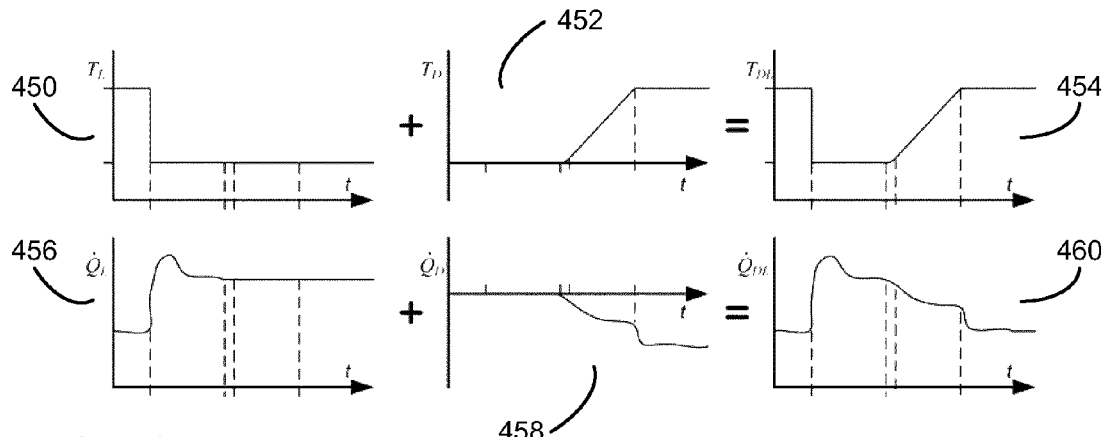
FIG. 4C is plots of constant, changing, and superpositioned temperature setpoints, and the corresponding cooling power uses, according to an exemplary embodiment.

FIG. 4C is a series of plots that show how superposition can be used to find the linear operator $\mathcal{L}$ that will lead to an optimal temperature setpoint trajectory. Plot 450 shows a temperature setpoint $T_L$ that is constant and low during the pre-cooling period and throughout the rest of the day. Plot 456 shows the cooling power use $\dot{Q}_L$, during the pre-cooling period and the rest of the day, corresponding to the temperature setpoint of plot 450. If the low temperature setpoint ($T_L$) is held constant at the pre-cooling temperature (as illustrated in plot 450), the power use ($\dot{Q}_L$) will stabilize at a high level (as illustrated in plot 456). The high level of power would be necessary to maintain the low, constant temperature setpoint throughout the day. Plot 452 shows a changing (e.g., increasing) temperature setpoint ($T_D$) during the demand limiting period. In some embodiments, the changing temperature setpoint can be linearly increased. In other embodiments, the changing temperature setpoint is increased in other ways, e.g., step-wise. Plot 458 shows the cooling power that is avoided during the demand limiting period as a result of the changing temperature setpoint of plot 452. Note that power is negative (i.e., not used) in plot 458 (illustrated by the curve falling below the x-axis). Plot 458 is the cooling power that is not expended when the temperature setpoint is increased (as in plot 452), compared to cooling power that would be required to maintain a constant, low temperature setpoint (as in plot 450). The plot 458 of power that is not expended during the demand limiting period may be referred to as deferred power $\dot{Q}_D$. In the discussion below, deferred power is variously referred to as deferred cooling load or deferred cooling power. Deferred power $\dot{Q}_D$ may be calculated by subtracting the cooling power use estimated to result from a constant temperature setpoint (plot 456 given plot 450) from the cooling power use resulting from a changing (e.g., increasing) temperature setpoint (plot 460 given plot 454). Plot 454 is the superposition or sum ($T_{DL}$) of the constant temperature setpoint during the pre-cooling period of plot 450 ($T_L$) and the changing temperature setpoint of plot 452 ($T_D$). Plot 460 is the superposition or sum ($\dot{Q}_{DL}$) of the cooling power during the pre-cooling period of plot 450 ($\dot{Q}_L$) and the deferred cooling power during the demand limiting period of plot 458 ($\dot{Q}_D$). Because of superposition, the sum ($T_{DL}$) of the constant temperature setpoint and the power deferring temperature setpoint (as in plot 454) will provide the sum ($\dot{Q}_{DL}$) of the constant power and the deferred power (as in plot 460).

To find the optimum setpoint trajectory it is necessary to find a linear operator $\mathcal{L}$ that, when applied to $\dot{Q}_D$ (deferred power use during the demand limiting period), mathematically transforms $\dot{Q}_D$ into some objectively optimal deferred power trajectory ($\dot{Q}_{obj}$) (i.e., a deferred power trajectory that will result in minimizing the cost of electricity during the demand limiting period). Once the linear operator $\mathcal{L}$ is found, then the same linear operator $\mathcal{L}$ can be applied to the changing temperature setpoint ($T_D$) during the demand limiting period. In other words, once $\mathcal{L}$ is found such that $\dot{Q}_{obj}=\mathcal{L}[\dot{Q}_D]$, $\mathcal{L}$ is applied to $T_D$ to achieve $T_D^+$. $T_D^+$ is the next day's changing setpoint trajectory during the demand limiting period. The + superscript indicates the next day. $T_D^+$ can be added to $T_L$ (the constant pre-cooling temperature setpoint trajectory) to obtain a full day's temperature setpoint trajectory (i.e., $T_{DL}^+=T_L+T_D^+$). Applying the full day's temperature setpoint trajectory results in total energy usage for the next day ($\dot{Q}_{DL}^+$) equal to the sum of the cooling power use during the pre-cooling period ($\dot{Q}_L$) and the target deferred cooling power use during the demand limiting period ($\dot{Q}_{obj}$), i.e., $\dot{Q}_{DL}^+=\dot{Q}_L+\dot{Q}_{obj}$. $\dot{Q}_{DL}^+$ may result in minimal electric costs during the demand limiting period if the objective power is chosen correctly.

The process is illustrated in FIG. 4D, according to an exemplary embodiment. On the training day, the temperature setpoint trajectory comprises a pre-cooling period and a limited power period. The training day may be one or more past days. The cooling power use is observed and the deferred power use ($\dot{Q}_D$) during the training day's limited power period is calculated (step 410). Then the target deferred power use for the next day ($\dot{Q}_{obj}$) is determined (step 412). Next, a liner operator $\mathcal{L}$ is found, where linear operator $\mathcal{L}$ mathematically transforms the deferred power use during the training day's limited power period ($\dot{Q}_D$) to the target deferred power use for the next day ($\dot{Q}_{obj}$) (step 414). That condition is mathematically represented by $\dot{Q}_{obj}=\mathcal{L}[\dot{Q}_D]$. The next day may be a next demand limiting day. Once such a liner operator $\mathcal{L}$ is found, it is then applied to the changing temperature setpoint ($T_D$), i.e., $\mathcal{L}[T_D]$. This results in the next day's changing setpoint trajectory during the demand limiting period ($T_D^+$) (step 416). That condition is mathematically represented by $T_D^+=\mathcal{L}[T_D]$. More detailed descriptions of calculating the linear operator and applying the linear operator are included in the description that follows.

In one embodiment (process diagrammed in FIG. 4E), linear operator $\mathcal{L}$ is a weighted sum of the proportional, integral, and derivative of the deferred power during the training day's limited power period ($\dot{Q}_D$) (step 418):

$$\mathcal{L}[\dot{Q}_D(t)] = w_\phi \dot{Q}_D(t) + w_i \int_0^t \dot{Q}_D(\tau)d\tau + w_\delta \frac{d\dot{Q}_D}{dt}$$

The optimum weights for this embodiment are determined by performing an optimization (minimization) of a cost function $J_w$ (step 420) over the weights $$J_w = \int_{DL} (\mathcal{L}[\dot{Q}_D(t)] - \dot{Q}_{obj}(t))^n dt$$

where n is an even power (e.g., 2).

In some embodiments, a larger (>2) even integer n can be chosen to more heavily weight larger deviations from the target deferred cooling power use ($\dot{Q}_{obj}$). This can be desirable in situations where the total cost depends in part on the demand charge, and the demand charge is largely based on load during peak periods. If $\dot{Q}_{obj}$ is constant during periods of constant cost, the demand charge would come at a time of peak deviation from $\dot{Q}_{obj}$.

The integral in the cost function $J_w$ is taken over the early start and demand limiting periods. The early start period refers to a small time period (e.g., 15 minutes) before the peak hours begin. When the demand charge increases by a large amount during peak hours, an early start may help reduce the demand by the beginning of the peak hours. If, on the other hand, the demand is reduced after the beginning of the peak hours, then the demand charge may be set at the level before the full potential of the response to the high demand charges has been achieved. Beginning the temperature setpoint trajectory during the early start period may help ensure that the peak demand charge will not be set at the beginning of the demand limiting period.

The temperature setpoint trajectory for the next day's early start and demand limiting periods is determined in terms of discrete variables. Sampling the power use, at specific sampling times $t=kT_s$, during the early start and demand limiting periods of the training day results in discrete time equivalents. Determining the temperature setpoint trajectory for the next day requires calculation of the optimal weights for the proportional, integral and derivative terms of the linear operator; this process is diagrammed in FIG. 4F. Two sets of basis vectors are associated with the demand limited period: the output basis vectors and the input basis vectors.

The output basis vectors are the vectors of the samples of the deferred power during the limited power period ($\dot{Q}_D$), its derivative and its integral at the specific sampling times $t=kT_s$ (step 422). These vectors are weighted together in order to obtain the target deferred power for the next day, $\dot{Q}_{obj}$. The output basis vectors are defined as:

$$\dot{Q}_{D\iota,d} = \begin{bmatrix} \dot{Q}_{D,d,1} \\ \sum_{k=1}^{2} \dot{Q}_{D,d,k} \\ \sum_{k=1}^{3} \dot{Q}_{D,d,k} \\ \vdots \\ \sum_{k=1}^{n} \dot{Q}_{D,d,k} \end{bmatrix},$$

$$\dot{Q}_{D\phi,d} = \begin{bmatrix} \dot{Q}_{D,d,1} \\ \dot{Q}_{D,d,2} \\ \dot{Q}_{D,d,3} \\ \vdots \\ \dot{Q}_{D,d,n} \end{bmatrix},$$

$$\dot{Q}_{D\delta,d} = \frac{1}{T_{sQ}} \begin{bmatrix} \dot{Q}_{D,d,1} - \dot{Q}_{D,d,0} \\ \dot{Q}_{D,d,2} - \dot{Q}_{D,d,1} \\ \dot{Q}_{D,d,3} - \dot{Q}_{D,d,2} \\ \vdots \\ \dot{Q}_{D,d,n} - \dot{Q}_{D,d,n-1} \end{bmatrix}$$

where the $\iota$, $\phi$, and $\delta$ subscripts represent the integral, proportional, and derivative basis vectors, respectively, and the d subscript represents the day on which the data was collected. $T_{sQ}$ is the sampling period of the output power.

In other embodiments of the invention, multiple days of data can be used in finding the linear operator $\mathcal{L}$. If multiple days are used, more weights can be used in the optimization problem. If noise is a concern, a Savitzky-Golay smoothing (or similar) filter may be applied to approximate the derivative of the signal. The Savitzky-Golay smoothing filter would be used to reduce the amount of noise while maintaining the relative location and magnitude of peaks and valleys in the derivative signal.

The input basis vectors are described in a similar manner, considering the derivative of the temperature setpoint to be the input to the system. The input basis vectors are:

$$\dot{T}_{\iota,d} = \begin{bmatrix} \dot{T}_{d,1} \\ \sum_{k=1}^{2} \dot{T}_{d,k} \\ \sum_{k=1}^{3} \dot{T}_{d,k} \\ \vdots \\ \sum_{k=1}^{n} \dot{T}_{d,k} \end{bmatrix},$$

$$\dot{T}_{\phi,d} = \begin{bmatrix} \dot{T}_{d,1} \\ \dot{T}_{d,2} \\ \dot{T}_{d,3} \\ \vdots \\ \dot{T}_{d,n} \end{bmatrix},$$

$$\dot{T}_{\delta,d} = \frac{1}{T_{sSP}} \begin{bmatrix} \dot{T}_{d,1} - \dot{T}_{d,0} \\ \dot{T}_{d,2} - \dot{T}_{d,1} \\ \dot{T}_{d,3} - \dot{T}_{d,2} \\ \vdots \\ \dot{T}_{d,n} - \dot{T}_{d,n-1} \end{bmatrix}$$

where $T_{sSP}$ is the sampling time of the setpoint derivative, which in general is not the same as the sampling time of the cooling power, $T_{sQ}$ (step 424). Once the optimal weights are determined, they may be applied to the input basis vectors in order to define the setpoint derivative for the demand limiting period of the next day.

In some situations, the setpoint may be raised faster than the actual zone temperature increases at its minimum cooling position. When the temperature setpoint is raised too fast the zone temperature will "float"; i.e., the temperature controller is no longer actively controlling the zone temperature because the actuator has become saturated. At this point the system is no longer linear. In such situations, the process may include determining and using an estimate of the temperature setpoint that would have caused the controller to output its minimum flow. Such an estimate may be to use the measured zone temperature itself in place of the temperature setpoint when the zone is "floating."

In nearly all environments, the temperature inside of the building is required to be confined to a specified comfort region, with a minimum temperature $\mathcal{T}_{min}$ and a maximum temperature $\mathcal{T}_{max}$. In some embodiments, the temperature setpoint will be caused to transition from approximately $\mathcal{T}_{min}$ to approximately $\mathcal{T}_{max}$ during the early start and demand limiting period for near optimal control. This total change in temperature setpoint, $$\Delta T \equiv \mathcal{T}_{max} - \mathcal{T}_{min},$$

may be controlled to remain the same after the weights are applied to the input basis vectors. This control may be provided by causing the average derivative of the temperature setpoint to remain constant after the weights are applied. This control may be provided by scaling the input basis vectors such that each has an average value equal to that of the average temperature setpoint derivative (step 426). The scale factors are given by:

$$s_{\iota,d} = \frac{\sum \dot{T}_{\phi,d}}{\sum \dot{T}_{\iota,d}},$$

and $$s_{\delta,d} = \frac{\sum \dot{T}_{\phi,d}}{\sum \dot{T}_{\delta,d}}.$$

A scaled version of the input will result in a scaled version of the output due to properties of linearity. Therefore, the output basis functions are similarly scaled before optimization is performed. Constraining the weights to sum to one is the equivalent to constraining the average derivative of the temperature setpoint to remain constant.

The optimization problem that can be solved to find the optimal weights can be stated as:

$$w^0 = \begin{bmatrix} w_I^0 \\ w_P^0 \\ w_D^0 \end{bmatrix} = \underset{w_I, w_P, w_D}{\mathrm{argmin}} \left\{ \sum \left( \hat{\dot{Q}}_D - \dot{Q}_{obj} \right)^n \right\}$$

where the estimated deferred cooling power ($\hat{\dot{Q}}_D$) is given by ($w_I$, $w_P$, $w_D$, contain the integral, proportional, and derivative weights for each day), $$\hat{\dot{Q}}_D = \sum_{d=1}^{n_d} w_{\iota,d} s_{\iota,d} \dot{Q}_{D\iota,d} + \sum_{d=1}^{n_d} w_{\phi,d} \dot{Q}_{D\phi,d} + \sum_{d=1}^{n_d} w_{\delta,d} s_{\delta,d} \dot{Q}_{D\delta,d},$$

subject to $$\sum w^p = 1;$$

i.e., the sum of all the weights must equal one to guarantee that the average derivative of the setpoint trajectory remains constant.

Any of several alternative optimization routines could be used in order to find the optimal weights, including sequential quadratic programming, interior-point method, or pseudo-inverse if n=2. Once the optimal weights are found they are applied in the same manner to find the derivative of the temperature setpoint that will be applied on the next day's demand limiting period. The temperature setpoint trajectory for the next day is given by, $$\dot{T}_D^+ = \sum_{d=1}^{n_d} w_{\iota,d}^p s_{\iota,d} \dot{T}_{\iota,d} + \sum_{d=1}^{n_d} w_{\phi,d}^p \dot{T}_{\phi,d} + \sum_{d=1}^{n_d} w_{\delta,d}^p s_{\delta,d} \dot{T}_{\delta,d}.$$

Integrating the derivative of the temperature setpoint so that it can be applied to the zones of the building can result in non-smooth setpoint trajectories ultimately leading to large spikes in the cooling power, especially if the sample time of the setpoint trajectory is large. In order to eliminate this effect, a Savitzky-Golay smoothing (or similar) filter can be used on the temperature setpoint trajectory.

Adjustments to Demand Response System

The output basis vectors may not span the function space containing the target deferred cooling power use ($\dot{Q}_{obj}$). In that case, the derivative of the temperature setpoint can be adjusted based on a simple capacitive model of the building where the deferred power during the limited power period, $\dot{Q}_D = \dot{Q}_{DL} - \dot{Q}_L$ as shown in FIG. 4C, is modeled as acting directly on a single capacitor. Thermal capacitance is governed by the equation $$\dot{Q} = -C\dot{\vartheta}$$

where C is the thermal capacitance and $\dot{\vartheta}$ is the actual temperature inside the building. A negative sign exists because $\dot{Q}$ is taken positive for cooling. To estimate capacitance, the total deferred energy ($Q_{DL}$) that entered the building (zone) and the change in temperature is be measured over the entire early start and demand limiting periods. An estimate for the lumped building capacitance is given by $$\hat{C}_{avg} = \frac{-\int_{DL} \dot{Q}_D dt}{\Delta \vartheta_{DL\ and\ ES}}$$

Once the capacitance is estimated, the derivative of the setpoint trajectory for the next day ($\dot{T}_D^+$) can be adjusted to bring the expected deferred cooling power ($\hat{\dot{Q}}_D$) closer to the target deferred cooling power ($\dot{Q}_{obj}$), using the simple capacitance model $\dot{Q} = C\dot{\vartheta}$. If the optimal weights are not able to cause the estimated deferred cooling power $\hat{\dot{Q}}_D$ for the next day to be identical to $\dot{Q}_{obj}$, then the derivative of the temperature setpoint can be increased at times when the estimate of the deferred cooling power is above $\dot{Q}_{obj}$ and decreased at times when the estimate of the deferred cooling power is below $\dot{Q}_{obj}$. During the next demand limiting period, the simple capacitive model yields $$\dot{T}_D^+ = \frac{\hat{\dot{Q}}_D}{\hat{C}_{avg}}.$$

For the deferred cooling load that corresponds to $\dot{Q}_{obj}$, the optimal temperature setpoint trajectory based on the simple capacitive model is given by, $$\dot{T}_{D,simple} = \frac{\dot{Q}_{obj}}{\hat{C}_{avg}}.$$

Subtracting the previous two equations, the adjustment that should be made to the derivative of the temperature setpoint is given by, $$\dot{T}_{adj} = \dot{T}_{D,simple} - \dot{T}_D^+ = \frac{\dot{Q}_{obj} - \hat{\dot{Q}}_D}{\hat{C}_{avg}},$$

and the temperature setpoint derivative that should be applied to the next demand limiting day is given by, $$\dot{T}_{DL}^+ = \dot{T}_L^+ + \dot{T}_D^+ + T_{adj}.$$

Finding Optimal Cooling Power Use

The technique for finding the setpoint trajectory that will cause the deferred cooling power to approximate some desired deferred cooling power $\dot{Q}_{obj}(t)$ based on the assumption of a linear system requires a determination of $\dot{Q}_{obj}(t)$.

The optimal deferred cooling power use can be calculated (or estimated) by dividing the total deferred energy, $$Q_D = \int_{DL} \dot{Q}_D(t)dt,$$

over the demand limiting period. The form of $\dot{Q}_{obj}(t)$ may be limited to a staircase function where the value is allowed to change only at times when the cost of energy changes (usually on the hour). If changes in the cooling power use at different constant temperature setpoints are ignored, then $\dot{Q}_D$ is dependent only on the start and end point of the temperature setpoint during the demand limiting period and independent of the trajectory. Furthermore, under this assumption, the staircase type function (constant when the costs are constant) may be optimal.

In the above systems and methods, it may be desirable to have a given average cooling power over the demand limiting period so that $\dot{Q}_D$ over that period is constant. Finding the optimal deferred cooling power is then finding the optimal average cooling power use for each time period of constant cost. This can be stated as, $$\dot{Q}_D^o = \underset{\dot{Q}_D}{\operatorname{argmin}}\left[\sum_{i=1}^{n_p} c_{energy,i} t_i \dot{Q}_{D,i} + \max(c_{demand,i} \dot{Q}_{D,i})\right],$$

subject to, $$\sum_{i=1}^{n_p} t_i \dot{Q}_{D,i} = Q_D,$$

where $n_P$ is the number of periods of constant cost, and $c_{energy,i}$ and $c_{demand,i}$ is the cost of energy and peak demand, respectively, during the $i^{th}$ period.

To take temperature constraints into account, the temperature constraints may be transformed into approximate deferred cooling power constraints. To avoid violating the temperature constraints, therefore, the sum of the deferred cooling power up to any point in time must be less than zero and greater than $Q_D$. If the sum were greater than zero at any point, the temperature would likely violate the $\mathcal{T}_{min}$ constraint. On the other hand, if the sum were less than $Q_D$ at any point then the temperature would likely violate the $\mathcal{T}_{max}$ constraint. Adding these constraints yields the optimization problem, $$\dot{Q}_D^o = \underset{\dot{Q}_D}{\operatorname{argmin}}\left[\sum_{i=1}^{n_p} c_{energy,i} t_i \dot{Q}_{D,i} + \max(c_{demand,i} \dot{Q}_{D,i})\right],$$

subject to, $$\sum_{i=1}^{n_p} t_i \dot{Q}_{D,i} = Q_D,$$

$$\sum_{i=1}^{n_i} t_i \dot{Q}_{D,i} > 0 \quad \forall n_i = 1, 2, \ldots, n_p,$$

$$\sum_{i=1}^{n_i} t_i \dot{Q}_{D,i} < Q_D \quad \forall n_i = 1, 2, \ldots, n_p.$$

This optimization problem can be performed via linear programming very efficiently by converting the cost function into a linear cost function with additional constraints. The linear form of this optimization problem is, $$\dot{Q}_D^o = \underset{\dot{Q}_D}{\operatorname{argmin}}\left[\sum_{i=1}^{n_p} c_{energy,i} t_i \dot{Q}_{D,i} + C_{demand}\right],$$

subject to, $$\sum_{i=1}^{n_p} t_i \dot{Q}_{D,i} = Q_D,$$

$$\sum_{i=1}^{n_i} t_i \dot{Q}_{D,i} > 0 \quad \forall n_i = 1, 2, \ldots, n_p,$$

$$\sum_{i=1}^{n_i} t_i \dot{Q}_{D,i} < Q_D \quad \forall n_i = 1, 2, \ldots, n_p,$$

$$c_{demand,i} \dot{Q}_{D,i} < C_{demand} \quad \forall i = 1, 2_p, \ldots, n_p.$$

Variations in Cooling Power Use, Demand Limiting Period or Temperature Constraints Thus far, the cooling power that the building would be using if the temperature setpoint was not changed was assumed to be constant over the demand limiting period. The cooling power use was calculated by projecting the use just before the early start period began forward until the end of the demand limiting period. This may be appropriate in some embodiments and in some buildings. While the cooling power use under a constant setpoint during the demand limiting period may be nearly flat, especially for shorter demand limiting periods, changes in occupancy, solar heating, and outdoor ambient temperature may cause some variation in the cooling power use. If the cooling power use due to the constant setpoint is not separated from the decrease in cooling power use due the changing setpoint during the demand limiting period, then some error may be induced in calculating the cooling power use due to the integral and derivative of the changing setpoint. A statistical model of the power use due to the constant setpoint during the demand limiting period may improve performance.

A simple model would be to take the mean of the cooling power use at each time of the day when temperature setpoints remain constant. The mean is taken over multiple days rather than over all times during the day; i.e., if the cooling power is sampled at times $t=T_s{}_Q k$ each day then the mean is given by, $$\bar{Q}_L = \begin{bmatrix} \bar{Q}_1 \\ \bar{Q}_2 \\ \bar{Q}_3 \\ \vdots \\ \bar{Q}_n \end{bmatrix}.$$

Using the mean cooling power use at each time of the day has the disadvantage of not taking into account the power use conditions of the current day. This may be overcome, in one embodiment, by assuming that the general shape of the cooling power use remains constant and is scaled for the current day based on the magnitude of the cooling power use just before the demand limiting period begins:

$$\bar{Q}_L = \dot{Q}_0 = \begin{bmatrix} \bar{Q}'_1 \\ \bar{Q}'_2 \\ \bar{Q}'_3 \\ \vdots \\ \bar{Q}'_n \end{bmatrix},$$

where $$\bar{Q}'_k = \overline{\left(\frac{\dot{Q}_k}{\dot{Q}_0}\right)}$$

represents the average normalized power at time $t = T_{sQ}k$, and $\dot{Q}_0$ is the cooling power use just before the demand limiting day would start. In other embodiments, estimating the power usage could be accomplished using different techniques.

If the length of the demand limiting period changes or the temperature constraints are changed, then past demand days become less useful for directly calculating the best setpoint trajectory for a demand limiting period with modified parameters. However, the single capacitor model, used above to calculate adjustments to the demand response system, can be used to give an approximation of the optimal control trajectory that can be used as a starting point before additional basis vectors (for the demand limiting period with the new parameters) are obtained.

If the temperature constraints, $\mathcal{T}_{min}$ and $\mathcal{T}_{max}$, are changed, then the budget to defer cooling power use $Q_D$ is also changed. The amount of this change can be approximated using the single capacitor model; the increase in budget given by, $$\Delta Q_D = \hat{C}_{avg}(\Delta T_{new} - \Delta T_{old}).$$

The new deferrable load budget can be used to calculate $\dot{Q}_{obj}$ as shown above in calculating the optimal deferred cooling power use. Additionally, the average derivative of the temperature setpoint $\dot{T}$ must be increased to guarantee that the new setpoint will vary from $\mathcal{T}_{min}$ to $\mathcal{T}_{max}$ during the demand limiting period. The fractional increase in the average derivative must be the same as the fractional increase in $\Delta T$. The fractional increase is given by the sum of the weights; therefore, the constraint on calculating the estimated deferred cooling power $(\hat{\dot{Q}}_D)$ must be modified to, $$\sum w^\rho = \frac{\Delta T_{new} - \Delta T_{old}}{\Delta T_{old}},$$

when calculating the optimal setpoint trajectories. The estimated deferred cooling power is then $$\hat{\dot{Q}}_D = \sum_{d=1}^{n_d} w_{t,d} s_{t,d} \dot{Q}_{Dt,d} + \sum_{d=1}^{n_d} w_{\phi,d} \dot{Q}_{D\phi,d} + \sum_{d=1}^{n_d} w_{\delta,d} s_{\delta,s} \dot{Q}_{D\delta,d}$$

subject to, $$\sum w^\rho = \frac{\Delta T_{new} - \Delta T_{old}}{\Delta T_{old}}.$$

If the length of the demand limiting period is modified, then the deferrable budget is not changed. Instead, only the average derivative of the setpoint trajectory is modified. First, the time scale is normalized so that the costs can be mapped onto times of the original data when calculating $\dot{Q}_{obj}$. Then, the constraint on calculating the estimated deferred cooling power $(\hat{\dot{Q}}_D)$ is modified so that the sum of the weights guarantees an average derivative of the temperature setpoint such that the temperature setpoint transitions from $\mathcal{T}_{min}$ to $\mathcal{T}_{max}$ in the modified time frame. Because the derivative is inversely proportional to the time of the period, the constraint becomes, $$\sum w^\rho = \frac{\Delta t_{old}}{\Delta t_{new}}.$$

Demand Response Layer

Figure 5:
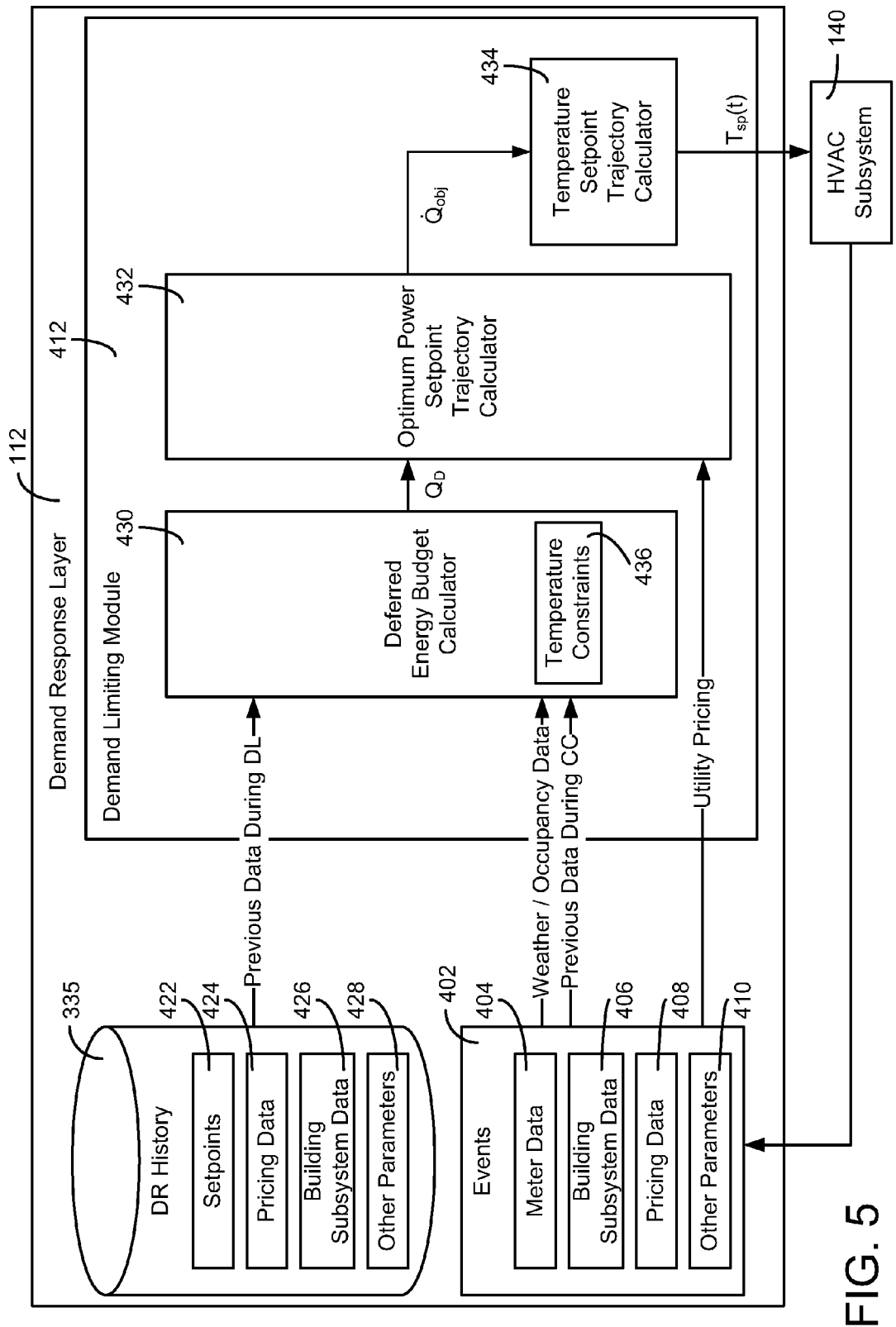
FIG. 5 is a block diagram of the demand response layer shown in FIG. 1A, according to an exemplary embodiment.

Referring now to FIG. 5, the DR layer 112 shown in FIGS. 1A-1B and 3 is shown in greater detail, according to an exemplary embodiment. DR layer 112 includes demand limiting module 412. Demand limiting module 412 is configured to control energy use of one or more building subsystems during a demand limiting period. Demand limiting module 412 may include a plurality of sub-modules configured to facilitate the demand limiting activity for varying types or numbers of building subsystems. In the exemplary embodiment shown in FIG. 4, demand limiting module 412 is shown to include a deferred energy budget calculator 430, optimum power setpoint trajectory calculator 432, and temperature setpoint trajectory calculator 434. Although only a single deferred energy budget calculator 430, optimum power setpoint trajectory calculator 432, and temperature setpoint trajectory calculator 434 are shown in FIG. 5, multiple deferred energy budget calculators, optimum power setpoint trajectory calculators, and temperature setpoint trajectory calculators may be provided in any one demand limiting module, demand response layer, or smart building manager. For example, a different deferred energy budget calculator, a different optimum power setpoint trajectory calculator, and a different temperature setpoint trajectory calculator may be provided for each building subsystem to be controlled in a demand limiting fashion.

The DR layer 112 receives information from event data 402, which corresponds to a store or stream of real-time, near real-time, or other parameters associated with demand limiting module 412. Event data 402 may include meter data 404 (e.g., a measured energy or power draw from smart grid 104 by the building, a measured energy or power use by HVAC subsystem 140 or a device thereof, etc.) received from a building meter, sub-meter associated only with the HVAC subsystem, a device that estimates energy use based on other building automation system values, or another device that measures energy use. Event data 402 may also include building subsystem data 406, which may include measured or calculated values associated with HVAC subsystem 140 (e.g., temperature data, air flow data, pressure data, etc.). Event data 402 may further include pricing data 408 for electrical energy use of smart grid 104. Pricing data 408 may be preloaded or provided by energy provider 102 periodically or in real-time. Event data 402 may also include other parameters 410 which provide additional constraints for the operation of demand limiting module 412 or to override its default operation. For example, other parameters 410 may include timing information (e.g., a start time to begin demand limiting, an end time to end demand limiting, a length of time for the demand limiting period, etc.), threshold information (e.g., temperature constraints or thresholds that define an acceptable comfort range, an acceptable energy use based on financial constraints, etc.), or override parameters (e.g., a parameter that disables demand limiting module 412, a parameter that changes the control strategy of feedback controller 414, etc.).

The DR layer 112 also includes DR History 335, which stores previous values associated with demand limiting module 412. The DR History 335 may include historical events, such as historical pricing data 424, historical building subsystem data 426, or other historical parameters 428. The DR History 335 may also include historical setpoints 422 associated with demand limiting module 412 (e.g., previous energy use setpoints, previous temperature setpoints, etc.). DR History 335 may provide demand limiting module 412 with data for using previous measurements and values to adapt to future conditions and to generate new energy use setpoints.

Demand limiting module 412 is configured to use a series of calculators 430, 432, and 434 to control energy use of a building subsystem. The calculators 430, 432, and 434 are configured to receive, process, generate, and output data and various operating parameters during the demand limiting period (including total energy output, power usage trajectory, and temperature setpoint trajectory). In the illustration of FIG. 5, deferred energy budget calculator 430 determines the total energy ($Q_D$) that can be added to the building, without violating temperature constraints, based on DR history 335 and event data 402. The event data considered include weather, occupancy, and length of demand limiting period. Deferred energy budget calculator 430 also accounts for constraints on the actual temperature inside of the building 436. Based on the total energy determined by the deferred energy budget calculator 430 and utility pricing data from event data 402, the optimum power setpoint trajectory calculator 432 determines the optimum deferred cooling power use ($\dot{Q}_{obj}$). Processes for determining the optimum deferred cooling power use are described above.

Though FIG. 5 shows that utility pricing data is considered by the optimum power setpoint trajectory calculator 430, utility pricing data and other event data 402 could be factored into other components of the demand limiting module 412. The optimum deferred cooling power use is provided to the temperature setpoint trajectory calculator 434. The temperature setpoint trajectory calculator 434 determines the setpoint trajectory that accomplishes the optimum deferred cooling power use. Such determinations are described in detail in the above description. The temperature setpoint trajectory calculator provides the setpoint trajectory to the HVAC system 140. Temperature setpoint trajectory calculator 434 can override user-provided temperature setpoints provided to HVAC subsystem 140 during a demand limiting period.

In other embodiments, demand limiting module 412 can operate the HVAC subsystem 140 outside of a demand limiting period. Demand limiting module 412 is configured to manipulate one or more HVAC subsystem setpoints (e.g., a temperature setpoint) based on the energy use setpoint and measured energy use. In some embodiments, one or more components of demand limiting module 412 may be integrated directly into the control of a device in HVAC subsystem 140, thereby providing direct control over the subsystem or a device thereof. In other embodiments, one or more components of demand limiting module 412 may be used as part of a cascading control strategy for a device in HVAC subsystem 140 and provide one or more device setpoints to the controller of the device. For example, a temperature setpoint may be sent from demand limiting module 412 to one or more controllers that regulate a variable air volume (VAV) box, an air handling unit (AHU), or a chiller in HVAC subsystem 140 based on the received temperature setpoint.

In general, the energy use setpoint and the measured energy use may be values that correspond to the use of energy by one or more devices in HVAC subsystem 140. For example, the energy use setpoint may be a heat transfer rate or an electrical power rate (e.g., in units of kW) indicative of electrical power used by HVAC subsystem 140. In some embodiments, the energy use setpoint and the measured energy use may be values that correspond to an overall building energy usage (consumption and/or power).

In some embodiments, a proxy value may also be used to represent an energy use. For example, if demand limiting module 412 is used to provide direct control over a device in HVAC subsystem 140, such as a VAV box, a flow setpoint may be used as a proxy for the energy use setpoint and a flow reading may be used as a proxy for the measured energy use.

Figure 6:
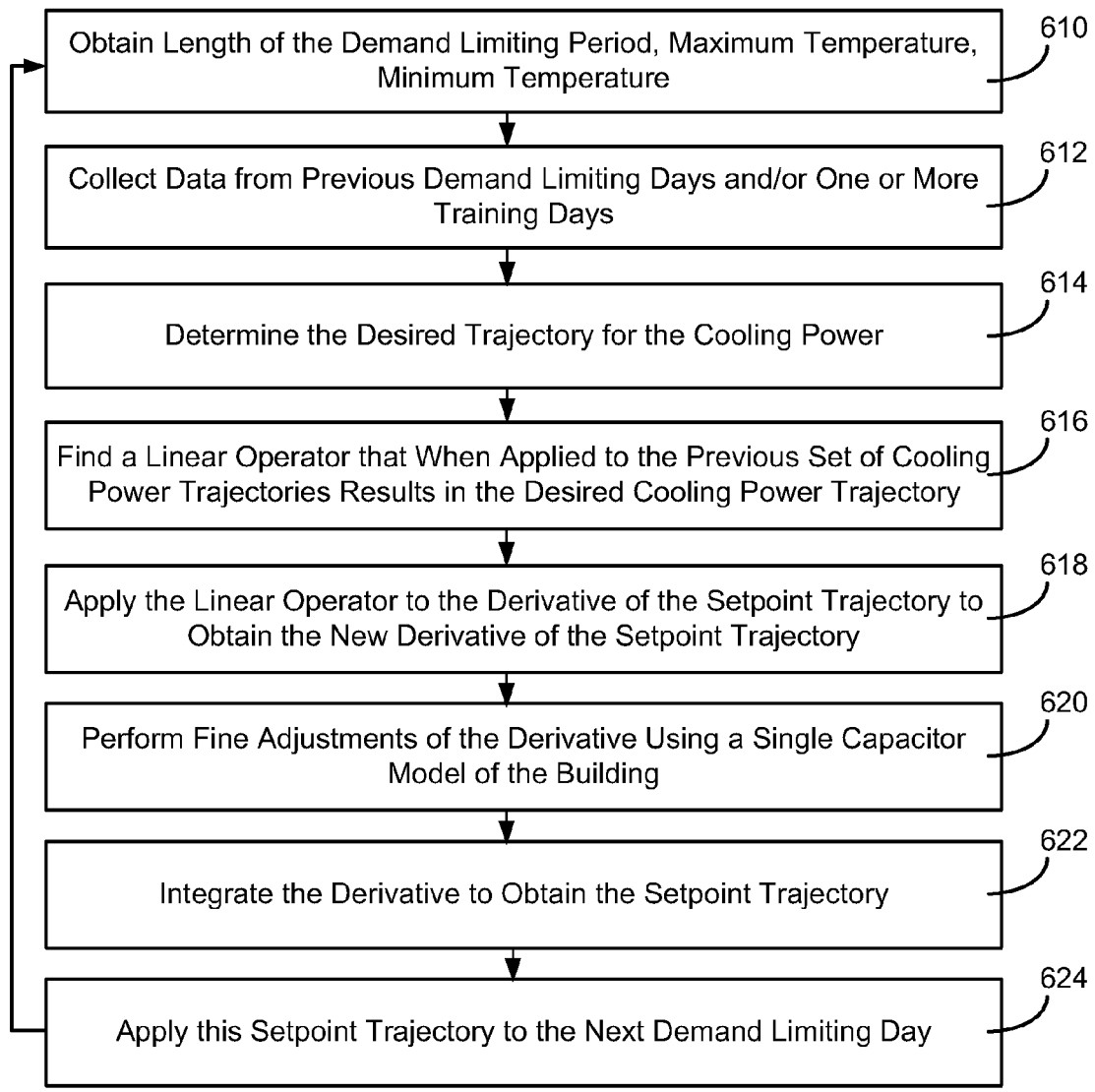
FIG. 6 is a flow chart providing a complete view of a process for controlling energy use, according to an exemplary embodiment.

Referring now to FIG. 6, a complete illustration of a process for controlling energy use in a building shown, according to an exemplary embodiment. The process of FIG. 6 is shown to include obtaining a length of the demand limiting period, a maximum temperature, and a minimum temperature (step 610). These constraints may be used as described above.

The process of FIG. 6 is further shown to include collecting data from previous demand limiting days and/or one or more training days (step 612). In some situations, a single training day may be used followed by using real historical data from previous demand limiting days. In other situations, training days could be conducted fairly regularly, e.g., once a week, to provide a 'reset' to the system. Such a reset may advantageously allow the system to adapt faster to changing weather patterns, building changes, or other transient conditions.

The process of FIG. 6 further includes determining the desired trajectory for the cooling power (step 614). Determining the desired trajectory for the cooling power may be conducted as described above in the finding optimal cooling power use section.

The process of FIG. 6 further includes finding a linear operator that when applied to the previous set of cooling power trajectories results in the desired cooling power trajectory (step 616). Processes for finding such a linear operator are described above.

The process of FIG. 6 further includes the step of applying the linear operator to the derivative of the setpoint trajectory to obtain a new derivative of the setpoint trajectory (step 618).

Fine adjustments may be performed on the derivative using a single capacitor model of the building (step 620). Integrating the adjusted derivative may provide the absolute numbers of the setpoint trajectory (step 622). The setpoint trajectory may then be applied to the next demand limiting day (step 624). Applying a setpoint trajectory to a day can mean causing building controllers to use the setpoint trajectory to adjust their respective temperature setpoints throughout the day. As shown in FIG. 6, the process can loop back to step 610. Instead of historical data from a training day, the historical data used may be from the previous day.

Configurations of Various Exemplary Embodiments

The construction and arrangements of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on memory or other machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products or memory comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The invention claimed is:

1. A method for controlling power consumption of a building HVAC system, the method comprising:
   using a controller of the HVAC system to calculate a deferred power usage resulting from a setpoint trajectory for a first time period;
   finding a target deferred power usage for a second time period subsequent to the first time period;
   finding a linear operator that transforms the deferred power usage for the first time period into the target deferred power usage; and
   applying the linear operator to the setpoint trajectory for the first time period to create a setpoint trajectory for the second time period.

2. The method of claim 1, wherein using a controller of the HVAC system to calculate the deferred power usage comprises:
   observing a power usage resulting from the setpoint trajectory for the first time period;
   estimating a hypothetical power usage resulting from a constant setpoint for the first time period; and
   calculating the deferred power usage by subtracting the observed power usage from the estimated hypothetical power usage.

3. The method of claim 1, wherein the first time period is a demand limiting period of a first day and the second time period is a demand limiting period of a second day subsequent to the first day.

4. The method of claim 1, wherein the setpoint trajectory for the first time period is a temperature setpoint trajectory; and
   wherein applying the linear operator to the setpoint trajectory for the first time period comprises operating the HVAC system using open loop control while a measured temperature of the building is within a predetermined temperature range.

5. The method of claim 1, wherein finding the linear operator that transforms the deferred power usage for the first time period into the target deferred power usage comprises:
   defining the linear operator as a weighted sum of multiple terms comprising at least one of an integral of the deferred power usage and a derivative of the deferred power usage;
   calculating relative weights for each of the multiple terms of the linear operator by minimizing a function of a difference between the linear operator and the target deferred power usage.

6. The method of claim 5, wherein calculating the relative weights comprises:
   finding a set of output basis vectors for the multiple terms of the linear operator based on samples of the deferred power usage;
   finding a set of input basis vectors for a setpoint derivative for the first time period based on samples of the setpoint derivative; and
   scaling the input basis vectors so each has an average value equal to an average setpoint derivative.

7. The method of claim 1, wherein finding the target deferred power usage for the second time period comprises:
   finding a total deferred energy usage during the first time period and an energy storage period prior to the first time period;

dividing the total deferred energy usage over the first time period;

finding an average power usage during parts of the first time period that have a constant energy cost; and performing an optimization routine to minimize the total cost of the deferred power usage for each period of constant energy cost during the first time period.

8. The method of claim 7, wherein finding the target deferred power usage for the second time period further comprises:

transforming at least one constraint on a measured temperature of the building to a constraint on the deferred power usage;

wherein the optimization routine minimizes the total energy cost subject to the constraint on deferred power usage.

9. The method of claim 1, further comprising:

using a capacitive model to estimate thermal energy storage in the building; and adjusting the setpoint trajectory for the second time period using the capacitive model.

10. The method of claim 1, wherein creating the setpoint trajectory for the second time period comprises accounting for variations in the power usage resulting from a non-constant setpoint by isolating power usage resulting from a constant setpoint.

11. A controller a building HVAC system, the controller comprising:

a processing circuit configured to calculate a deferred power usage resulting from a setpoint trajectory for a first time period;

wherein the processing circuit is configured to find a target deferred power usage for a second time period subsequent to the first time period;

wherein the processing circuit is configured to find a linear operator that transforms the deferred power usage for the first time period into the target deferred power usage; and wherein the processing circuit is configured to apply the linear operator to the setpoint trajectory for the first time period to create a setpoint trajectory for the second time period.

12. The controller of claim 11, wherein the deferred power usage is calculated by:

observing a power usage resulting from the setpoint trajectory for the first time period;

estimating a hypothetical power usage resulting from a constant setpoint for the first time period; and calculating the deferred power usage by subtracting the observed power usage from the estimated hypothetical power usage.

13. The controller of claim 11, wherein the first time period is a demand limiting period of a first day and the second time period is a demand limiting period of a second day subsequent to the first day.

14. The controller of claim 11, wherein the setpoint trajectory is a temperature setpoint trajectory; and wherein the linear operator is applied to the setpoint trajectory by operating the HVAC system using open loop control while a measured temperature of the building is within a predetermined temperature range.

15. The controller of claim 11, wherein the linear operator that transforms the deferred power usage for the first time period into the target deferred power usage is found by:

defining the linear operator as a weighted sum of multiple terms comprising at least one of an integral of the deferred power usage and a derivative of the deferred power usage;

calculating relative weights for each of the multiple terms of the linear operator by minimizing a function of a difference between the linear operator and the target deferred power usage.

16. The controller of claim 15, wherein the relative weights is calculated by:

finding a set of output basis vectors for the multiple terms of the linear operator based on samples of the deferred power usage;

finding a set of input basis vectors for a setpoint derivative for the first time period based on samples of the setpoint derivative; and scaling the input basis vectors so each has an average value equal to an average setpoint derivative.

17. The method of claim 11, wherein the target deferred power usage for the second time period is found by:

finding a total deferred energy usage during the first time period and an energy storage period prior to the first time period;

dividing the total deferred energy usage over the first time period;

finding an average power usage during parts of the first time period that have a constant energy cost; and performing an optimization routine to minimize the total cost of the deferred power usage for each period of constant energy cost during the first time period.

18. The controller of claim 17, wherein the target deferred power usage for the second time period is found by:

transforming at least one constraint on a measured temperature of the building to a constraint on the deferred power usage;

wherein the optimization routine minimizes the total energy cost subject to the constraint on deferred power usage.

19. The controller of claim 11, wherein the processing circuit is configured to:

use a capacitive model to estimate thermal energy storage in the building; and adjust the setpoint trajectory for the second time period using the capacitive model.

20. The controller of claim 11, wherein the setpoint trajectory for the second time period is created by accounting for variations in the power usage resulting from a non-constant setpoint by isolating power usage resulting from a constant setpoint.

* * * * *